United States Patent
Kinoshita

(10) Patent No.: US 7,399,952 B2
(45) Date of Patent: Jul. 15, 2008

(54) IMAGE PROCESSING APPARATUS AND IMAGE CAPTURING APPARATUS

(75) Inventor: Masaya Kinoshita, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/483,781

(22) Filed: Jul. 10, 2006

(65) Prior Publication Data

US 2007/0018074 A1 Jan. 25, 2007

(30) Foreign Application Priority Data

Jul. 11, 2005 (JP) .......................... P2005-202034

(51) Int. Cl.
- G01J 1/44 (2006.01)
- H01J 40/14 (2006.01)
- H03F 3/08 (2006.01)

(52) U.S. Cl. .............................. 250/214 R; 250/208.1; 250/226; 348/222.1; 348/273; 348/231.99; 382/164

(58) Field of Classification Search ............. 250/214 R, 250/226, 208.1; 348/222.1, 273, 231.99; 382/164

See application file for complete search history.

(56) References Cited

U.S. PATENT DOCUMENTS

| 5,164,824 A | * | 11/1992 | Ieoka et al. ............ 348/231.99 |
| 5,418,565 A | | 5/1995 | Smith |
| 5,617,224 A | * | 4/1997 | Ichikawa et al. ............ 358/530 |
| 6,160,578 A | * | 12/2000 | Carroll et al. ............ 348/222.1 |
| 2002/0012054 A1 | * | 1/2002 | Osamato ...................... 348/273 |
| 2003/0048369 A1 | * | 3/2003 | Guarnera at el. ............ 348/273 |
| 2003/0164885 A1 | | 9/2003 | Tanaka et al. |
| 2005/0145777 A1 | | 7/2005 | Barna et al. |
| 2006/0274389 A1 | * | 12/2006 | Inukai ........................ 358/530 |

FOREIGN PATENT DOCUMENTS

| EP | 1349399 A | 10/2003 |
| JP | 7-75019 A | 3/1995 |
| JP | 2002-252808 A | 9/2002 |

* cited by examiner

Primary Examiner—Georgia Y. Epps
Assistant Examiner—Seung C. Sohn
(74) Attorney, Agent, or Firm—Lerner, David, Littenberg, Krumholz & Mentlik, LLP

(57) ABSTRACT

An image processing apparatus for processing a color image signal includes a signal processing unit for processing a plurality of image signals in parallel, where the plurality of image signals are in one-to-one correspondence with predetermined filter components; a storage unit including storage areas in one-to-one correspondence with the filter components; a parameter receiving unit for receiving a control parameter indicating a setting according to an input sequence of the filter components in the image signal; a writing unit for sorting multichannel input image signals based on a signal output from a solid-state image sensor by the filter components thereof based on the setting indicated by the control parameter and for writing the sorted image signals to the corresponding storage areas; and a reading unit for sequentially reading out the image signals from the storage areas via individual output channels and for delivering the image signals to the signal processing unit.

21 Claims, 40 Drawing Sheets

MUX TYPE A

MUX TYPE B

8-CH READOUT, MUX TYPE A

8-CH READOUT, MUX TYPE B

6-CH READOUT, MUX TYPE B

4-CH READOUT, MUX TYPE B

2-CH READOUT, MUX TYPE A/B

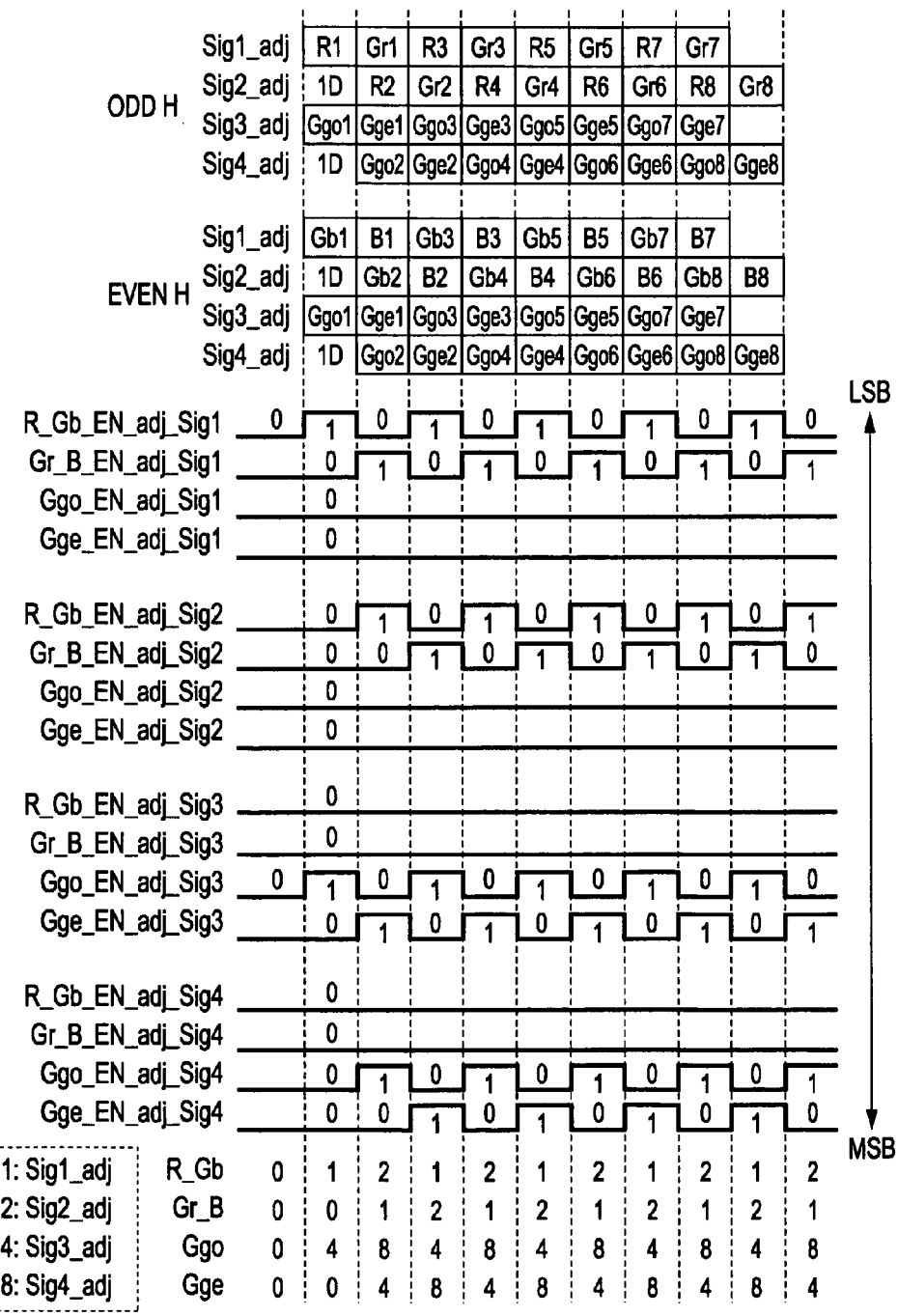

FIG. 22
6-CH READOUT, MUX TYPE A

| | | | | | | | | | | | |
|---|---|---|---|---|---|---|---|---|---|---|---|
| | Sig1_adj | R1 | Gr1 | Gr2 | R3 | R4 | Gr4 | Gr5 | R6 | | |
| ODD H | Sig2_adj | 1D | R2 | Ggo1 | Gr3 | Gge2 | R5 | Ggo4 | Gr6 | Gge5 | |
| | Sig3_adj | 1D | 1D | Gge1 | Ggo2 | Ggo3 | Gge3 | Gge4 | Ggo5 | Ggo6 | Gge6 |
| | Sig4_adj | — None. — | | | | | | | | | |

| | | | | | | | | | | | |
|---|---|---|---|---|---|---|---|---|---|---|---|
| | Sig1_adj | Gb1 | B1 | B2 | Gb3 | Gb4 | B4 | B5 | Gb6 | | |
| EVEN H | Sig2_adj | 1D | Gb2 | Ggo1 | B3 | Gge2 | Gb5 | Ggo4 | B6 | Gge5 | |
| | Sig3_adj | 1D | 1D | Gge1 | Ggo2 | Ggo3 | Gge3 | Gge4 | Ggo5 | Ggo6 | Gge6 |
| | Sig4_adj | — None. — | | | | | | | | | |

LSB ↑

| | | | | | | | | | | |
|---|---|---|---|---|---|---|---|---|---|---|
| R_Gb_EN_adj_Sig1 | 0 | 1 | 0 | 0 | 1 | 1 | 0 | 0 | 1 | 1 | 0 |
| Gr_B_EN_adj_Sig1 | 0 | 0 | 1 | 1 | 0 | 0 | 1 | 1 | 0 | 0 | 1 |
| Ggo_EN_adj_Sig1 | 0 | 0 | 0 | 0 | 0 | 0 | 0 | 0 | 0 | 0 | 0 |
| Gge_EN_adj_Sig1 | 0 | 0 | 0 | 0 | 0 | 0 | 0 | 0 | 0 | 0 | 0 |
| R_Gb_EN_adj_Sig2 | 0 | 0 | 1 | 0 | 0 | 0 | 1 | 0 | 0 | 0 | 1 |
| Gr_B_EN_adj_Sig2 | 0 | 0 | 0 | 0 | 1 | 0 | 0 | 0 | 1 | 0 | 0 |
| Ggo_EN_adj_Sig2 | 0 | 0 | 0 | 1 | 0 | 0 | 0 | 1 | 0 | 0 | 0 |
| Gge_EN_adj_Sig2 | 0 | 0 | 0 | 0 | 0 | 1 | 0 | 0 | 0 | 1 | 0 |
| R_Gb_EN_adj_Sig3 | 0 | 0 | 0 | 0 | 0 | 0 | 0 | 0 | 0 | 0 | 0 |
| Gr_B_EN_adj_Sig3 | 0 | 0 | 0 | 0 | 0 | 0 | 0 | 0 | 0 | 0 | 0 |
| Ggo_EN_adj_Sig3 | 0 | 0 | 0 | 0 | 1 | 1 | 0 | 0 | 1 | 1 | 0 |
| Gge_EN_adj_Sig3 | 0 | 0 | 0 | 1 | 0 | 0 | 1 | 1 | 0 | 0 | 1 |
| R_Gb_EN_adj_Sig4 | 0 | 0 | 0 | 0 | 0 | 0 | 0 | 0 | 0 | 0 | 0 |
| Gr_B_EN_adj_Sig4 | 0 | 0 | 0 | 0 | 0 | 0 | 0 | 0 | 0 | 0 | 0 |
| Ggo_EN_adj_Sig4 | 0 | 0 | 0 | 0 | 0 | 0 | 0 | 0 | 0 | 0 | 0 |
| Gge_EN_adj_Sig4 | 0 | 0 | 0 | 0 | 0 | 0 | 0 | 0 | 0 | 0 | 0 |

MSB ↓

| | | | | | | | | | | | |
|---|---|---|---|---|---|---|---|---|---|---|---|
| 1: Sig1_adj | R_Gb | 0 | 1 | 2 | 0 | 1 | 1 | 2 | 0 | 1 | 1 | 2 |
| 2: Sig2_adj | Gr_B | 0 | 0 | 1 | 1 | 2 | 0 | 1 | 1 | 2 | 0 | 1 |
| 4: Sig3_adj | Ggo | 0 | 0 | 0 | 2 | 4 | 4 | 0 | 2 | 4 | 4 | 0 |
| 8: Sig4_adj | Gge | 0 | 0 | 0 | 4 | 0 | 2 | 4 | 4 | 0 | 2 | 4 |

8-CH READOUT, MUX TYPE A

8-CH READOUT, MUX TYPE B

6-CH READOUT, MUX TYPE A

4-CH READOUT, MUX TYPE A (PRIOR ART)

(PRIOR ART)

(PRIOR ART)

(PRIOR ART)

(PRIOR ART)

| R | Gr | R | Gr | R | Gr | R | Gr |
|---|----|---|----|---|----|---|----|
| Gb | B | Gb | B | Gb | B | Gb | B |
| R | Gr | R | Gr | R | Gr | R | Gr |
| Gb | B | Gb | B | Gb | B | Gb | B |
| R | Gr | R | Gr | R | Gr | R | Gr |
| Gb | B | Gb | B | Gb | B | Gb | B |
| R | Gr | R | Gr | R | Gr | R | Gr |
| Gb | B | Gb | B | Gb | B | Gb | B |

(PRIOR ART)

FIG. 39B

Clock (ODD H / EVEN H)

| | | | | |
|---|---|---|---|---|
| CH-1 OUTPUT | R | R | R | R |
| CH-2 OUTPUT | Gb | Gb | Gb | Gb |
| CH-3 OUTPUT | Gr | Gr | Gr | Gr |
| CH-4 OUTPUT | B | B | B | B |

(PRIOR ART)

(PRIOR ART)

ent application claims priority from Japanese
IMAGE PROCESSING APPARATUS AND IMAGE CAPTURING APPARATUS

CROSS-REFERENCE TO RELATED APPLICATIONS

The present application claims priority from Japanese Patent Application No. JP 2005-202034 filed on Jul. 11, 2005, the disclosure of which is hereby incorporated by reference herein.

BACKGROUND OF THE INVENTION

The present invention relates to an image processing apparatus for processing a color image signal and an image capturing apparatus including the functionality of the image processing apparatus and, in particular, to an image processing apparatus and an image capturing apparatus including a signal processing circuit having the functionality to process a plurality of image signals of predetermined filter components in parallel.

Image capturing apparatuses, such as digital video cameras and digital still cameras, include image sensors (e.g., charge coupled devices (CCDs) or complementary metal oxide semiconductor image sensors (CMOS sensors)). In general, these image sensors read out signals from two-dimensionally arranged pixels, converts the signals into one data stream, and outputs the data stream from an output channel. For example, in a known CCD, image signals are delivered to a vertical register provided to each of a plurality of columns. Subsequently, these signals are delivered to a horizontal register on a row-by-row basis and are output. Thus, these signals are converted to one data stream. In contrast, in CMOS sensors, for example, image signals for one of a plurality of rows are read out and stored in capacitors provided to all of columns. The signals are sequentially output from the first capacitor or the last capacitor so as to be converted to one data stream.

FIG. 33 is a block diagram of an exemplary structure of a main portion of an image capturing apparatus including a 1-channel output image sensor.

As shown in FIG. 33, an analog front-end (AFE) circuit 912 includes a correlated double sampling (CDS) circuit, an auto gain control (AGC) circuit, and an analog-to-digital (A/D) conversion circuit. The analog front-end (AFE) circuit 912 converts an analog image signal from an image sensor 911 to a digital signal and outputs the digital signal. A camera signal processing circuit 913 performs a variety of camera signal processing (e.g., digital clamp, noise reduction, defect correction, demosaic (synchronization), white balance correction, and resolution conversion) on the image signal from the AFE circuit 912. Finally, the camera signal processing circuit 913 outputs the image signal to a baseband processing circuit 914 in the form of a luminance signal (Y) and a color-difference signal (C). The baseband processing circuit 914 performs processing relating to a baseband (e.g., compression coding of the input image signal and conversion of the signal to a monitor display signal).

A color sequence of an image signal input to the camera signal processing circuit 913 is discussed below with reference to a Bayer array format, which is widely used as filter coding of an image sensor. FIGS. 34A and 34B are diagrams illustrating a color sequence when pixel signals of an image sensor having the Bayer array format are output from one output channel.

As shown in FIG. 34A, in an image sensor having the Bayer array format, pixels are arranged so that R and Gr are alternately disposed from the head of odd rows and Gb and B are alternately disposed from the head of even rows. When only one output channel is provided, pixels are sequentially scanned in the horizontal direction from the upper left of this pixel array. When a 1H period is completed, the next row is scanned in the same manner so that image signals are read out. Accordingly, as shown in FIG. 34B, the color sequence of a pixel signal output from the image sensor 911 to an output channel Ch1 is "R, Gr, R, Gr . . . " for an odd H period and "Gb, B, Gb, B . . . " for an even H period. Therefore, the camera signal processing circuit 913 that performs processing for individual colors needs to recognize such a color sequence and appropriately carry out various processes for an R color, G color, and B color of the input signal in synchronization with the color sequence.

In recent years, image capturing apparatuses including an image sensor with a large number of pixels exceeding a million pixels have been increasingly used. In such an image sensor, since the number of pixels is large, a readout frequency of pixels becomes significantly high for the above-described 1-channel readout method. In particular, when, like a video camera, the readout time for one screen is limited, a high frequency is required. For example, if the readout frequency becomes too high, the consumption power is increased. In addition, due to the limitation of analog signal processing, the reading out of the signal may be impossible.

To solve such a problem, in recent years, camera signal processing systems capable of reading out pixel signals of an image sensor via multiple channels have been developed. If the camera processing systems can read out pixel signals from the image sensor via multiple channels, the readout frequency for one channel can be reduced. Thus, the above-described problem can be solved.

If the multichannel readout is employed, a multichannel-specific problem (such as uneven levels of analog signals from the channels) may arise. Accordingly, a technique that detects a difference of signal levels between channels and corrects the difference (refer to, for example, Japanese Unexamined Patent Application Publication No. 7-75019, in particular, paragraphs [0013] to [0016] and FIG. 1) and a technique that detects that difference on the basis of the integral value with respect to a plurality of rows (refer to, for example, Japanese Unexamined Patent Application Publication No. 2002-252808, in particular, paragraphs [0020] to [0033] and FIG. 1) have been proposed.

Examples of the color sequence when multiple output channels are used in an image sensor of the Bayer array format are given below. FIGS. 35A-B through 37A-B are diagrams illustrating color sequences when pixel signals are read out via 2 channels, 3 channels, and 4 channels, respectively.

In FIG. 35A, pixel signals starting from the first pixel are alternately output to two output channels Ch1 and Ch2. In this case, as shown in FIG. 35B, by simultaneously reading out two pixels (one for the channel Ch1 and one for the channel Ch2) in one clock cycle, the readout frequency can be reduced by ½. Additionally, in FIG. 36A, pixel signals starting from the first pixel are sequentially assigned to three output channels Ch1, Ch2, and Ch3 and are output to these output channels. In this case, as shown in FIG. 36B, by simultaneously outputting signals from three pixels in one clock cycle, the readout frequency can be reduced to ⅓. In FIG. 37A, pixel signals starting from the first pixel are sequentially assigned to four output channels Ch1 to Ch4 and are output to the four output channels. In this case, as shown in FIG. 37B, by simultaneously outputting signals from four pixels in one clock cycle, the readout frequency can be reduced to ¼.

Furthermore, as shown in FIG. 38A through 40B, a technique for simultaneously reading out pixel signals from a plurality of rows to the corresponding output channels has been proposed. FIGS. 38A-B through 40A-B illustrate color sequences in the cases where pixel signals for 2 rows are read out via 2, 4, and 6 channels, respectively.

As shown in FIG. 38A, the output channel Ch1 is assigned to odd rows of the image sensor whereas the output channel Ch2 is assigned to even rows of the image sensor. In this case, as shown in FIG. 38B, by simultaneously reading out pixel signals from 2 rows in one clock cycle, the readout frequency can be reduced by ½.

In FIG. 39A, the output channels Ch1 to Ch4 are assigned to sets of 2 rows×2 columns of the image sensor. In this example, signals from rows 1 and 2 of a column 1 are output to the channels Ch1 and Ch2, respectively. In addition, signals from rows 1 and 2 of a column 2 are output to the channels Ch3 and Ch4, respectively. In this case, as shown in FIG. 39B, by simultaneously reading out 4 pixel signals in one clock cycle, the readout frequency can be reduced to ¼.

In FIG. 40A, the output channels Ch1 to Ch4 are assigned to sets of 2 rows×3 columns of the image sensor. In this example, signals from rows 1 and 2 of a column 1 are output to the channels Ch1 and Ch2, respectively. In addition, signals from rows 1 and 2 of a column 2 are output to the channels Ch3 and Ch4, respectively. Signals from rows 1 and 2 of a column 3 are output to the channels Ch5 and Ch6, respectively. In this case, as shown in FIG. 40B, by simultaneously reading out 6 pixel signals in one clock cycle, the readout frequency can be reduced to ⅙.

It is noted that, for image sensors of an XY address scanning type (e.g., the CMOS sensors), the above-described readout operations can be easily achieved without significantly changing the basic structure thereof.

As noted above, by providing a plurality of output channels, the total number of clock cycles required for reading out pixel signals for one screen can be reduced, and therefore, the readout frequency can be reduced. However, as noted above, a plurality of output sequences are possible depending on the number of channels and depending on which pixel groups are read out in parallel. An appropriate signal processing circuit needs to be developed for the selected output sequence and needs to be mounted in the camera.

For example, as shown in FIGS. 39A and 39B, four filter components R, Gb, Gr, and B repeatedly appear during a readout operation. If this repeat number "4" (or an integral multiple of "4") is equal to the number of output channels, one output channel can output a signal of the same filter component in any H period. Thus, the downstream circuits (e.g., the camera signal processing circuit 913 shown in FIG. 33) can process signals of the same filter component at a time. Accordingly, the circuit configuration can be simplified. However, in many cases (e.g., the case shown in FIGS. 40A and 40B), this condition is not satisfied. Due to the restrictions relating to the number of output channels and the readout frequency based on the circuit scale and the manufacturing cost, it is not easy to design the circuit that always satisfies the above-described condition.

Additionally, a system has been proposed in which multichannel signals output from an image sensor are not directly delivered to the downstream circuit. The system multiplexes the signals to reduce the number of channels and delivers the signals. FIG. 41 is an exemplary block diagram of a signal processing system having such multiplexing functionality.

Unlike the configuration shown in FIG. 33, the configuration of the signal processing system shown in FIG. 40 has a multiplexer (MUX) function in an AFE circuit 912a. The AFE circuit 912a multiplexes signals output from N channels into signals for, for example, N/2 channels (N: an integer greater than 2). For example, by time-multiplexing signals from two adjacent channels, the AFE circuit 912a can reduce the number of output channels. Although such a multiplexing operation doubles the output frequency, this high frequency can be achieved by multiplexing the signals after the signals are converted to digital signals.

In this multiplexing operation, since a plurality of combinations of the multiplexed channels appear, a signal processing circuit corresponding to each of a plurality of output sequences needs to be developed in addition to supporting a large number of output channels and a large number of parallel readout patterns from the above-described image sensor.

As described above, there are many patterns of the output sequence of pixel signals from the image sensor. When the outputs are multiplexed, the number of the patterns is further increased. All of the blocks of the downstream signal processing circuit need to operate so as to support all the output sequences. To support all the above-described output sequences, the configuration of the signal processing circuit becomes large-scaled and significantly complicated.

In recent years, in order to reduce the development and manufacturing costs when introducing new types of image capturing apparatuses to market, there has been a growing demand for design of a signal processing circuit that can support different types of image sensors (e.g., image sensors of different pixel resolutions) for several years without requiring changing of the basic configuration thereof. However, it is difficult to determine all of pixel-signal readout methods that are anticipated to be used for the next few years. Accordingly, the supporting specifications are limited.

SUMMARY OF THE INVENTION

Accordingly, the present invention provides a small-scaled image processing apparatus that is versatile enough to support a change in the input sequence of image signals.

The present invention also provides an image capturing apparatus including a small-scaled image processing function that is versatile enough to support a change in the input sequence of image signals.

According to an embodiment of the present invention, an image processing apparatus for processing a color image signal includes signal processing means for processing a plurality of image signals in parallel, where the plurality of image signals are in one-to-one correspondence with predetermined filter components; storage means including storage areas in one-to-one correspondence with the filter components; parameter receiving means for receiving a control parameter indicative of a setting in accordance with an input sequence of the filter components in the image signal; writing means for sorting multichannel input image signals based on a signal output from a solid-state image sensor by the filter components thereof based on the setting indicated by the control parameter, where the writing means writes the sorted image signals to the corresponding storage areas; and reading means for sequentially reading out the image signals from the storage areas via individual output channels, the reading means delivering the image signals to the signal processing means.

In such an image processing apparatus, the image processing means is capable of processing a plurality of image signals in parallel, where the plurality of image signals are in one-to-one correspondence with predetermined filter components. Under the control of the writing means and the reading means, multichannel input image signals based on the output signal from a solid-state image sensor are stored in the storage means and are then delivered to the image processing means. The storage means includes storage areas in one-to-one correspondence with the filter components. The parameter receiving means receives a control parameter indicative of a setting in accordance with an input sequence of the filter components in the image signal.

The writing means sorts the multichannel input image signals by the filter components thereof based on the setting indicated by the control parameter. Subsequently, the writing means writes the sorted image signals to the corresponding storage areas. The reading means sequentially reads out the image signals from the storage areas via individual output channels and delivers the image signals to the signal processing means. Thus, image signals sorted by the filter components and to be processed by the signal processing means in parallel are output so that the signal processing means receives the image signals sorted by the filter components according to a constant rule, regardless of the input sequence of the image signal.

As described above, the writing means sorts the multichannel input image signals by the filter components thereof based on the setting indicated by the control parameter in accordance with the input sequence of the input image signal. The reading means sequentially reads out the image signals from the storage areas via individual output channels and delivers the image signals to the signal processing means. Thus, the image signals sorted by the filter components and to be processed by the signal processing means in parallel are output from individual channels of the storage means. Therefore, even when the input sequences of the image signal are different, the image signals sorted by the filter components according to a constant rule can be supplied to the signal processing means.

Accordingly, the image processing apparatus can support changes in the input sequence due to changes in the combination of, for example, the number of readout channels of the solid-state image sensor, the multiplexing method of readout pixel signals, the number of pixels of the solid-state image sensor, and the filter coding without changing the circuit configuration. In addition, the circuit scale of the signal processing means can be significantly reduced compared with signal processing means including processing functions of supporting all of the input sequences.

BRIEF DESCRIPTION OF THE DRAWINGS

FIG. 21 illustrates a decoding operation of a selection signal when the number of readout channels of an image sensor is "8" in the MUX type A;

FIG. 22 illustrates a decoding operation of a selection signal when the number of readout channels of an image sensor is "6" in the MUX type A;

FIGS. 39A and 39B are diagrams illustrating a color sequence when pixel signals in two rows are read out using four channels;

DETAILED DESCRIPTION

Exemplary embodiments of the present invention are described in detail with reference to the accompanying drawings.

Figure 1:
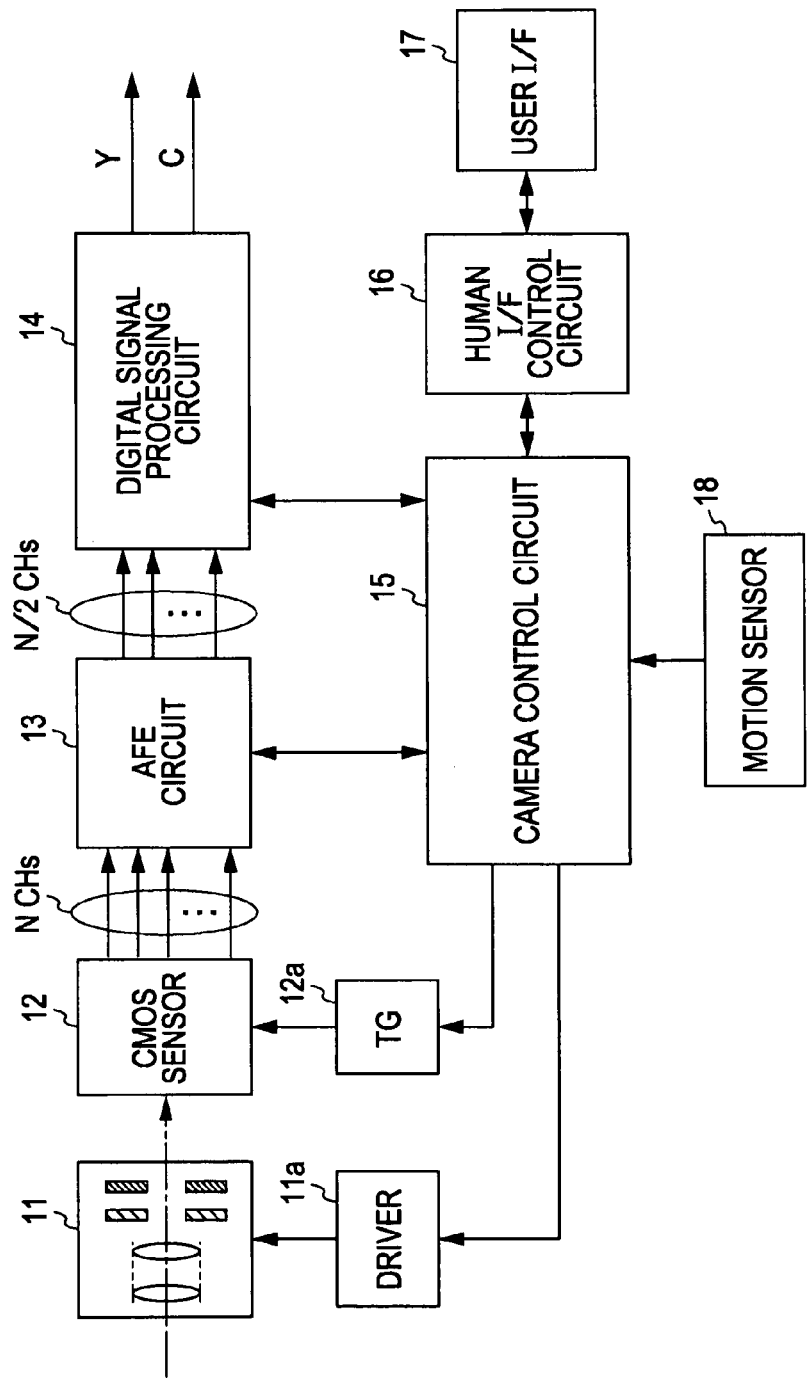
FIG. 1 is a block diagram of the structure of the main part of an image capturing apparatus according to an embodiment of the present invention.

FIG. 1 is a block diagram of the structure of the main part of an image capturing apparatus according to an embodiment of the present invention.

As shown in FIG. 1, an image capturing apparatus includes an optical block 11, a driver 11a, a CMOS image sensor 12 (hereinafter simply referred to as a "CMOS sensor"), a timing generator (TG) 12a, an analog front-end (AFE) circuit 13, a digital signal processing circuit 14, a camera control circuit 15, a human interface (I/F) control circuit 16, a user I/F 17, and a motion sensor 18.

The optical block 11 includes a lens for collecting light from a subject onto the CMOS sensor 12, a driving mechanism for moving the lens to carry out focusing and zooming, a shutter mechanism, and an iris mechanism. The driver 11a drives each mechanism in the optical block 11 on the basis of a control signal from the camera control circuit 15.

The CMOS sensor 12 includes a plurality of pixels arranged on a CMOS substrate in a two-dimensional array. Each of the pixels includes a photodiode (photogate), a transfer gate (shutter transistor), a switching transistor (address transistor), an amplifying transistor, and a reset transistor (reset gate). The CMOS sensor 12 further includes a vertical scanning circuit, a horizontal scanning circuit, and an output circuit of an image signal on the CMOS substrate. The CMOS sensor 12 is driven by means of a timing signal output from the TG 12a and converts incoming light from the subject into an electrical signal. The TG 12a outputs a timing signal under the control of the camera control circuit 15.

The CMOS sensor 12 has a plurality of output channels for outputting pixel signals. The CMOS sensor 12 can output pixel signals from those output channels in parallel so as to reduce the readout frequency. In addition, for example, the CMOS sensor 12 may have a function of summing pixel signals of the same filter component from the adjacent pixels in a row on the image sensor and may output the signals at the same time. Thus, the image signal can be output at a higher screen rate than the normal screen rate without increasing a synchronous frequency for reading out a pixel signal. Furthermore, an image sensor other than the CMOS sensor (e.g., a CCD device) may be used.

The AFE circuit 13 is composed of, for example, one integrated circuit (IC). The AFE circuit 13 carries out a sample-hold operation on the image signal output from the CMOS sensor 12 by using a correlated double sampling (CDS) method so as to obtain a sufficient signal/noise (S/N) ratio. The AFE circuit 13 then controls the gain of the image signal by means of an auto gain control (AGC) process, carries out an A/D conversion, and outputs the digital image signal. A circuit for performing the CDS processing may be formed on the same substrate as the CMOS sensor 12.

Furthermore, the AFE circuit 13 has a multiplexer (MUX) function of time-multiplexing the image signals input from the CMOS sensor 12 via a plurality of channels in order to reduce the number of output channels and output the image signals. For example, the AFE circuit 13 receives an N-channel image signal from the CMOS sensor 12 and outputs the signal as an N/2-channel signal.

The digital signal processing circuit 14 is composed of, for example, one integrated circuit (IC). The digital signal processing circuit 14 carries out all or some of a variety of camera signal processes (e.g., an auto focus (AF) process, an auto exposure (AE) process, white balance correction, and gamma correction) on the image signal from the AFE circuit 13 and carries out a detection process for controlling the camera signal processes. In particular, according to the present embodiment, the digital signal processing circuit 14 has a function of changing the order of the image signals from the AFE circuit 13 via the plurality of channels and inputting the image signals to the above-described processing blocks.

The camera control circuit 15 is, for example, a microcontroller including a central processing unit (CPU), a read only memory (ROM), and a random access memory (RAM). The camera control circuit 15 executes a program stored in, for example, the ROM so as to perform total control of the components of the image capturing apparatus. For example, the camera control circuit 15 identifies the state of the current input image on the basis of the detection data from the digital signal processing circuit 14 and the detection signal from the motion sensor 18. Subsequently, the camera control circuit 15 controls an image capturing operation and performs image quality correction in accordance with the setting mode specified by the human I/F control circuit 16.

The user I/F 17 includes a display for informing a user of the setting mode. The user I/F 17 further includes keys and levers for inputting a user operation. The human I/F control circuit 16 detects a setting mode (such as a shooting mode) selected by the user and delivers that information to the camera control circuit 15. Additionally, the human I/F control circuit 16 instructs the user I/F 17 to display camera control information received from the camera control circuit 15 (such as a subject distance, the F number, a shutter speed, and the magnification ratio of a zoom lens) for the user.

The motion sensor 18 detects camera shake by means of a two-dimensional acceleration sensor or an angular velocity sensor when an image is captured. The motion sensor 18 then delivers a detection signal to the camera control circuit 15.

In this image capturing apparatus, light received by the CMOS sensor 12 is converted to an electrical signal, which is sequentially delivered to the AFE circuit 13. The signal is subjected to the CDS process and the AGC process. The signal is then converted to a digital signal. The digital signal processing circuit 14 carries out image quality correction on the digital image signal delivered from the AFE circuit 13. Finally, the digital signal processing circuit 14 converts the digital image signal to a luminance signal (Y) and a color-difference signal (C) and outputs these signals.

Image data output from the digital signal processing circuit 14 is delivered to a graphic I/F (not shown) and is converted to a display image signal. Thus, a camera through image is displayed on a display unit, such as a liquid crystal display (LCD). Additionally, when the user performs an input operation on the user I/F 17 so that the camera control circuit 15 is instructed to record an image, the image data from the digital signal processing circuit 14 is delivered to an encoder (not shown). The image data is subject to a predetermined image compression process and is recorded on a recording medium (not shown). When a still image is recorded, the digital signal processing circuit 14 delivers image data for one frame to the encoder. In contrast, when a moving image is recorded, image data processed by the digital signal processing circuit 14 are continuously delivered to the encoder.

Figure 2:
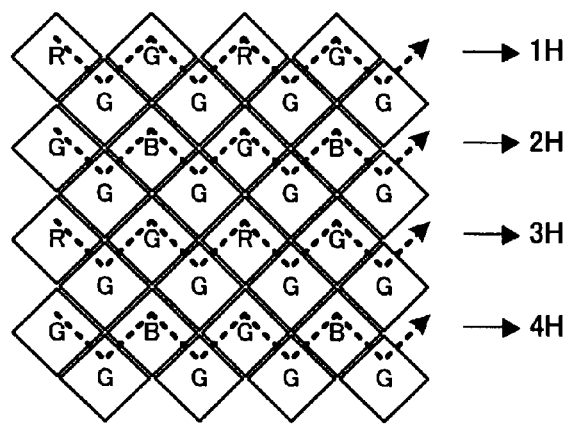
FIG. 2 illustrates the arrangement of color filters of a CMOS sensor.

Filter coding applied to the CMOS sensor 12 of the image capturing apparatus is described next. FIG. 2 illustrates the arrangement of color filters of the CMOS sensor 12.

In the color filter arrangement shown in FIG. 2, a square grid array is tilted at an angle of 45° and each of R and B filters is surrounded by G filters. This structure can provide the spatial frequency characteristics necessary to realize sufficient human visibility characteristics for the R and B components and can increase the spatial frequency characteristics for the G component which the human eye is more sensitive to than the R and B components, compared with the known Bayer array format. The G component is an essential component for generating a luminance component. The G component increases the resolution of luminance for not only a subject of an achromatic color but also a subject of chromatic color. Thus, the quality of an image can be increased.

In this color filter arrangement, as shown by a dotted arrow in FIG. 2, pixels in two adjacent rows are alternately read out during a horizontal sync period. That is, when only one output channel is provided, the pixels are scanned and read out in this order. From an image sensor having such a color filter arrangement, the pixels are read out using eight output channels in a variety of ways, as will be described below.

Figure 3:
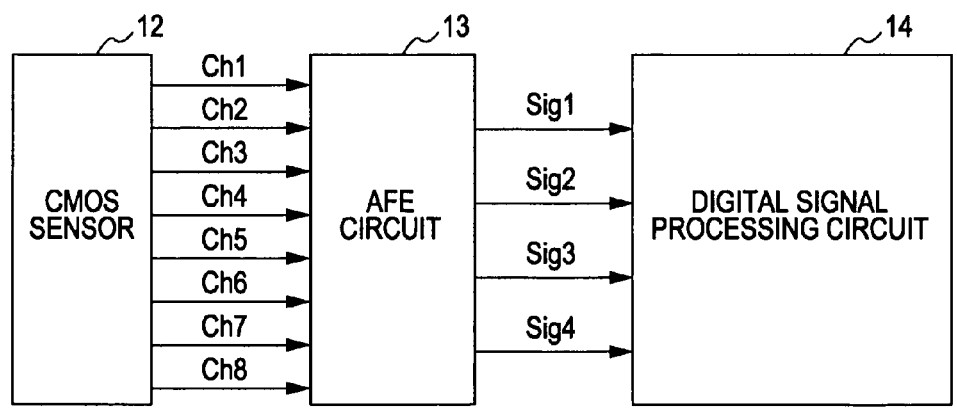
FIG. 3 illustrates a configuration for the multichannel reading out of signals from the CMOS sensor and multiplexing of the signals.

FIG. 3 illustrates a configuration for the multichannel reading out of signals from the CMOS sensor 12 and multiplexing of the signals.

As noted above, the AFE circuit 13 multiplexes N-channel pixel signals from the CMOS sensor 12 and outputs N/2-channel signals. In this embodiment, on the assumption that, as shown in FIG. 3, the pixel signals are read out from the CMOS sensor 12 in parallel using up to 8 channels and are output to the AFE circuit 13, these channels are designated Ch1 to Ch8. Additionally, the AFE circuit 13 receives these input signals via the 8 channels and time multiplexes these signals into multiplexed signals for up to 4 channels (e.g., Sig1 to Sig4). Thereafter, the AFE circuit 13 delivers these multiplexed signals Sig1 to Sig4 to the digital signal processing circuit 14.

In such a configuration, the output frequency of the multiplexed signals Sig1 to Sig4 from the AFE circuit 13 is twice the readout frequency of the CMOS sensor 12. Even when the CMOS sensor 12 includes a large number of pixels, such as several million, the readout frequency can be reduced to within the allowable range of the analog signal processing by increasing the number of signals read out in parallel. Additionally, since the multiplexed signals Sig1 to Sig4 are transferred from the AFE circuit 13 to the digital signal processing circuit 14 in the form of digital signals, the transfer frequency can be easily increased so as to be higher than the readout frequency of the CMOS sensor 12.

Figure 4:
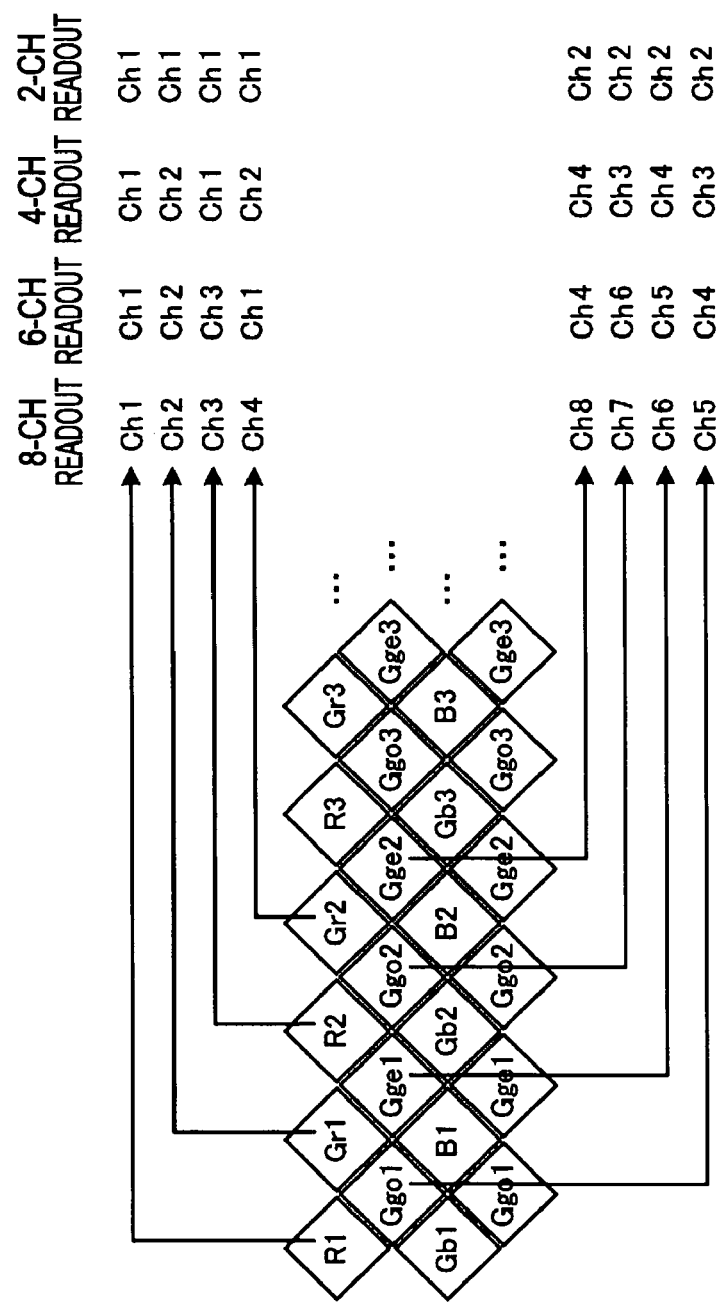
FIG. 4 illustrates an example of an output channel allocation scheme for a pixel position on the CMOS sensor.

FIG. 4 illustrates an example of an output channel allocation scheme for a pixel position on the CMOS sensor 12.

According to this embodiment, as shown in FIG. 4, a color filter on the CMOS sensor 12, for convenience of description, is classified into six types of a filter component: R, B, Gr, Gb, Ggo, or Gge. In practice, for the Gr, Gb, Ggo, and Gge filter components, color filters having the same spectroscopic characteristic are used. However, since the digital signal processing circuit 14 identifies the four filter components Gr, Gb, Ggo, and Gge as different filter components, these six types of pixel are recognized as different filter components. Additionally, the pixels of each filter component are designated with reference numerals "R1", "R2", . . . from the side read out first on the image sensor (from the left in FIG. 4) in the horizontal direction.

As shown in FIG. 4, on the CMOS sensor 12, R and Gr are alternately arranged in a first row, Ggo and Gge are alternately arranged in a second row, Gb and B are alternately arranged in a third row, and Ggo and Gge are alternately arranged in a fourth row. As examples, the processes are discussed here in which signals are read out from an image sensor having such filter coding via 8, 6, 4, or 2 channels in parallel.

When pixels are read out in parallel via 8 channels, pixels in an odd row are sequentially allocated from the first pixel to the output channels Ch1, Ch2, Ch3, and Ch4, whereas pixels in an even row are sequentially allocated from the first pixel to the output channels Ch5, Ch6, Ch7, and Ch8. Thus, the signals are output. When pixels are read out in parallel via 6 channels, pixels in an odd row are sequentially allocated from the first pixel to the output channels Ch1, Ch2, and Ch3, whereas pixels in an even row are sequentially allocated from the first pixel to the output channels Ch4, Ch5, and Ch6. Thus, the signals are output.

When pixels are read out in parallel via 4 channels, pixels in an odd row are sequentially allocated from the first pixel to the output channels Ch1 and Ch2, whereas pixels in an even row are sequentially allocated from the first pixel to the output channels Ch3 and Ch4. Thus, the signals are output. When pixels are read out in parallel via 2 channels, pixels in an odd row are allocated to the output channel Ch1, whereas pixels in an even row are allocated to the output channel Ch2. Thus, the signals are output.

Figure 5A:
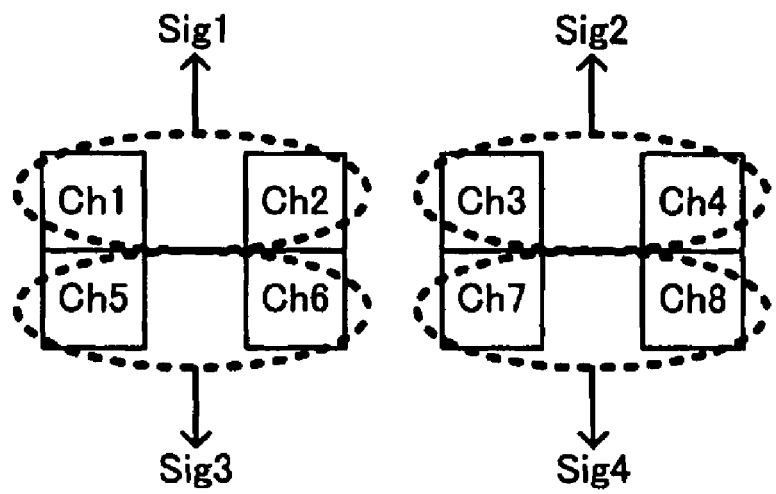
FIGS. 5A and 5B illustrate different variations in a multiplexing scheme in an AFE circuit.
Figure 5B:
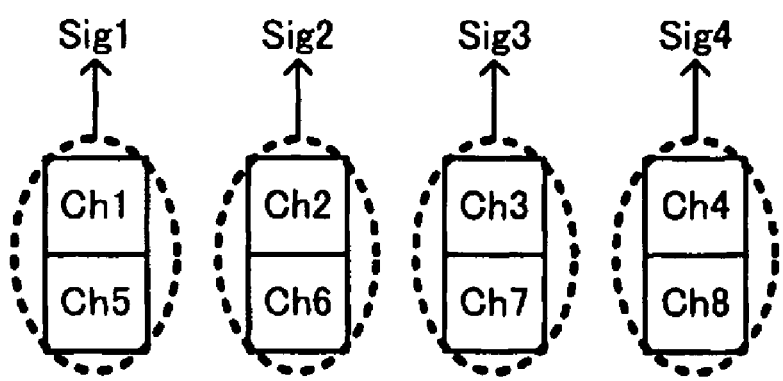

FIGS. 5A and 5B illustrate variations in the multiplexing scheme in the AFE circuit 13.

According to the present embodiment, as examples, two multiplexing schemes shown in FIGS. 5A and 5B are discussed. In a MUX type A shown in FIG. 5A, signals from the output channels Ch1 and Ch2 are multiplexed to generate a multiplexed signal Sig1. Signals from the output channels Ch3 and Ch4 are multiplexed to generate a multiplexed signal Sig2. Signals from the output channels Ch5 and Ch6 are multiplexed to generate a multiplexed signal Sig3. Signals from the output channels Ch7 and Ch8 are multiplexed to generate a multiplexed signal Sig4. That is, signals from two adjacent pixels on the image sensor in the horizontal direction are multiplexed.

In contrast, in a MUX type B shown in FIG. 5B, the output channels Ch1 and Ch5 are multiplexed to generate a multiplexed signal Sig1. Signals from the output channels Ch2 and Ch6 are multiplexed to generate a multiplexed signal Sig2. Signals from the output channels Ch3 and Ch7 are multiplexed to generate a multiplexed signal Sig3. Signals from the output channels Ch4 and Ch8 are multiplexed to generate a multiplexed signal Sig4. That is, signals from two adjacent pixels on the image sensor in the vertical direction are multiplexed.

Figure 6:
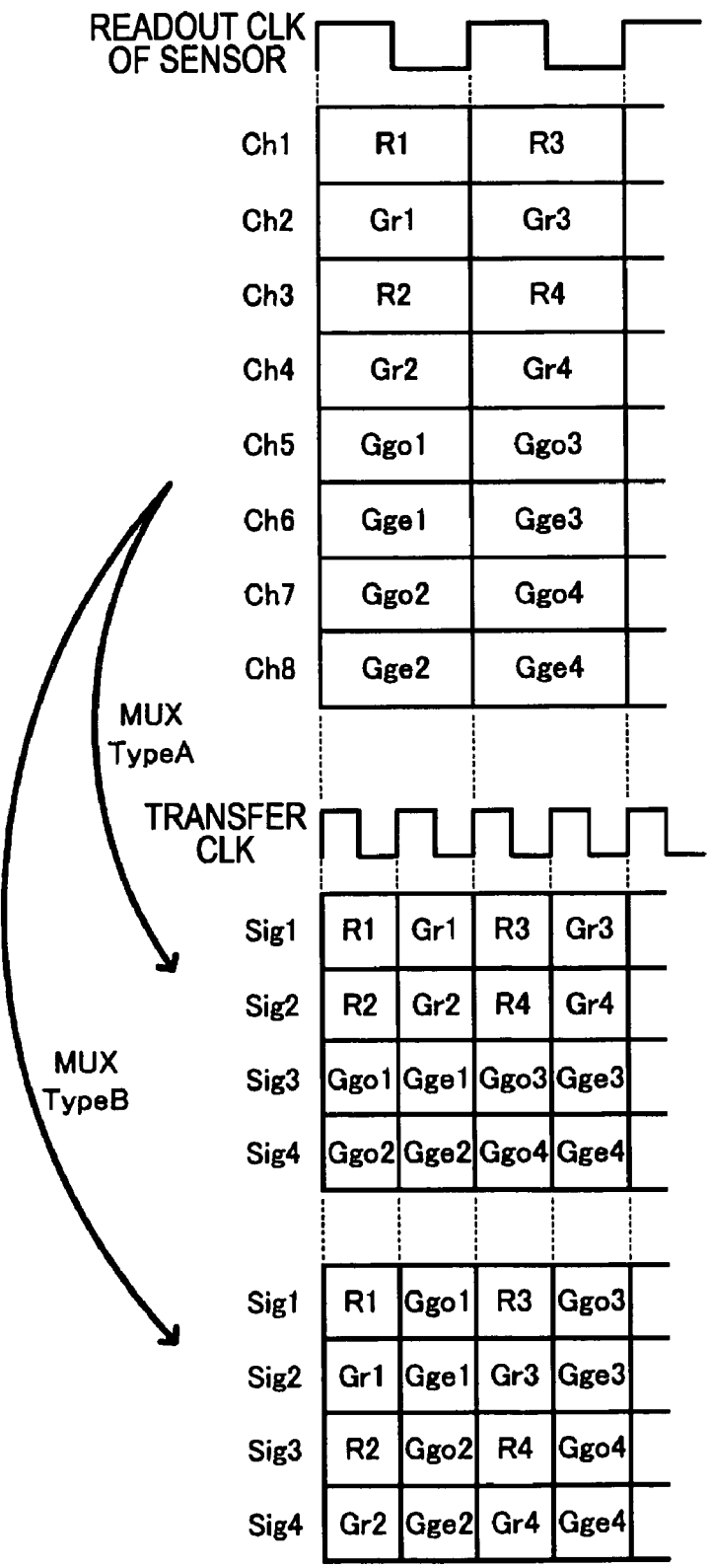
FIG. 6 illustrates an example of multiplexing when pixels are read out via 8 channels.

FIG. 6 illustrates an example of multiplexing when pixels are read out via 8 channels. Here, as an example, a color sequence in an odd horizontal sync period (hereinafter referred as an "odd H period") is illustrated.

When pixel signals input to the AFE circuit 13 via 8 channels are multiplexed in the MUX type A, R1 and Gr1 in the output channels Ch1 and Ch2 simultaneously read out in one clock cycle from the CMOS sensor 12 are sequentially time multiplexed into a multiplexed signal Sig1 in synchronization with a transfer clock cycle that is twice the readout clock cycle. In contrast, in the MUX type B, R1 and Ggo1 in the output channels Ch1 and Ch5 simultaneously read out in one clock cycle from the CMOS sensor 12 are sequentially time multiplexed into a multiplexed signal Sig1.

When considering the variations in output channel allocation for the image sensor and the variations in multiplexing in the AFE circuit 13, a variety of color sequences of an image signal input to the digital signal processing circuit 14 appear, as described below. Furthermore, depending on the filter coding and the number of pixels of the image sensor, the number of color sequences further increases.

The downstream digital signal processing circuit 14 needs to carry out the internal process in consideration of the color sequence of the input image signal. If the digital signal processing circuit 14 is designed and manufactured separately for individual color sequences, the production efficiency significantly decreases. Therefore, according to the present embodiment, the digital signal processing circuit 14 has a function of sorting input image signals by a variety of color sequences in the input stage thereof. By simply setting a parameter of the sort function for each color sequence from the camera control circuit 15, the digital signal processing circuit 14 can support the variety of color sequences without changing the internal circuit configuration.

Figure 7:
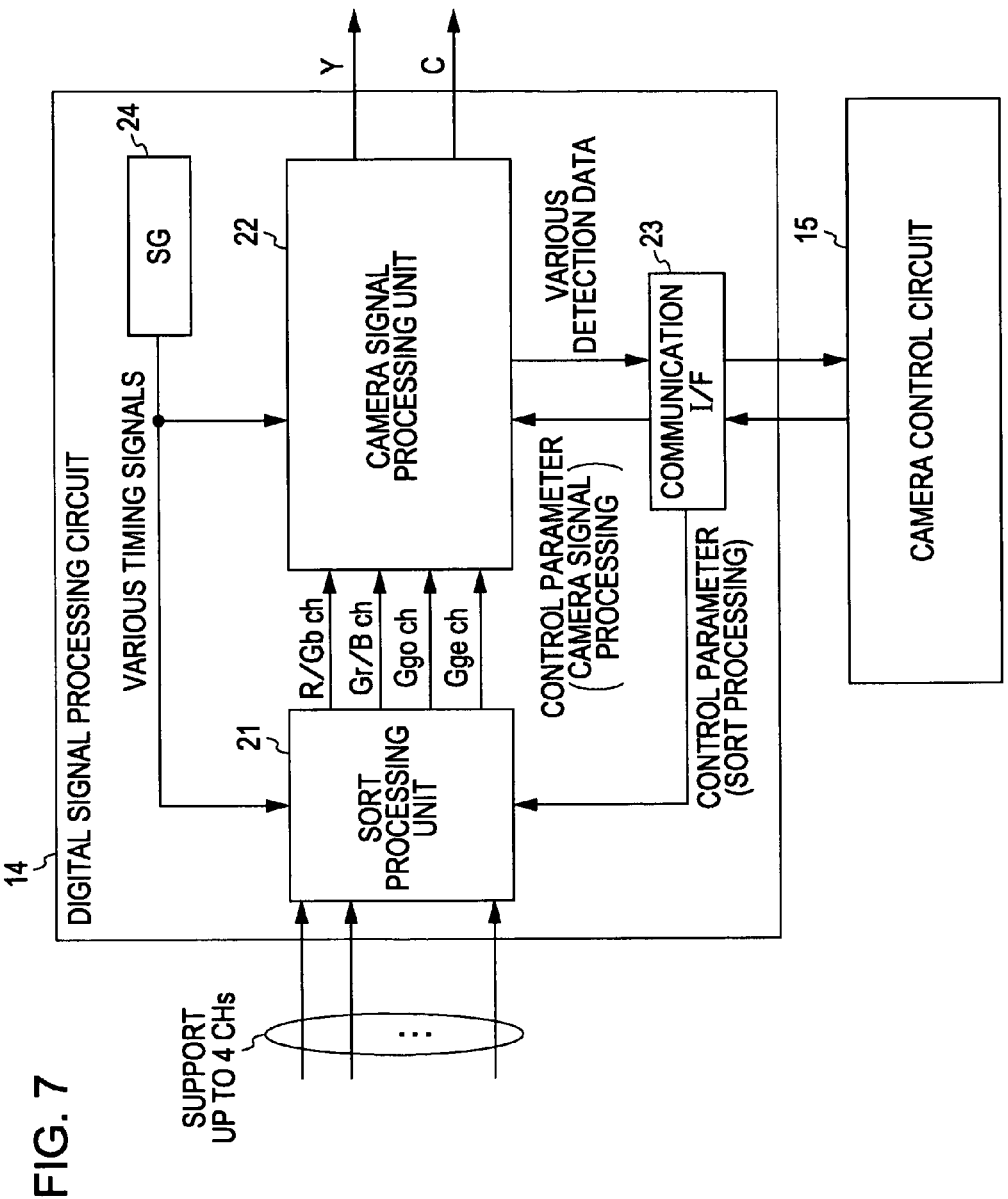
FIG. 7 is a block diagram of the internal configuration of a digital signal processing circuit.

FIG. 7 is a block diagram of the internal configuration of the digital signal processing circuit 14.

As shown in FIG. 7, the digital signal processing circuit 14 includes a sort processing unit 21, a camera signal processing unit 22, a communication I/F 23, and a signal generator (SG) 24. The sort processing unit 21 changes the order of N/2-channel image signals (4-channel image signals in this example) having a variety of color sequences into S-channel signals, each having a specific color filter component. Thereafter, the sort processing unit 21 delivers the S-channel signals to the camera signal processing unit 22. In this example, signals of the four channels, namely, an R/Gb channel, a Gr/B channel, a Ggo channel, and a Gge channel are output.

The camera signal processing unit 22 carries out known general camera signal processing on the basis of the image signals from the sort processing unit 21. Examples of the camera signal processing include a digital clamp, noise reduction, defective pixel correction, demosaic processing, white balance control, and a resolution conversion. In these processes, in accordance with a control parameter from the camera control circuit 15, image signals input via the S (=4) channels are processed in parallel. Finally, the signals are converted to Y and C signals and are delivered to the downstream baseband processing system.

The communication I/F 23 is an interface circuit for controlling data input and output between each of processing blocks of the digital signal processing circuit 14 and the camera control circuit 15. Detection data of the camera signal processing unit 22 are delivered to the camera control circuit 15 via the communication I/F 23. The camera control circuit 15 delivers a control parameter for processing a camera signal to the camera signal processing unit 22 via the communication I/F 23. In addition, the camera control circuit 15 delivers a control parameter for controlling the sort operation to the sort processing unit 21 via the communication I/F 23.

The SG 24 is a processing block for generating a variety of timing signals used for the processing of the sort processing unit 21 and the camera signal processing unit 22. For example, the SG 24 generates an enable signal H_EN that indicates an effective period of the image signal in the horizontal direction.

Figure 8:
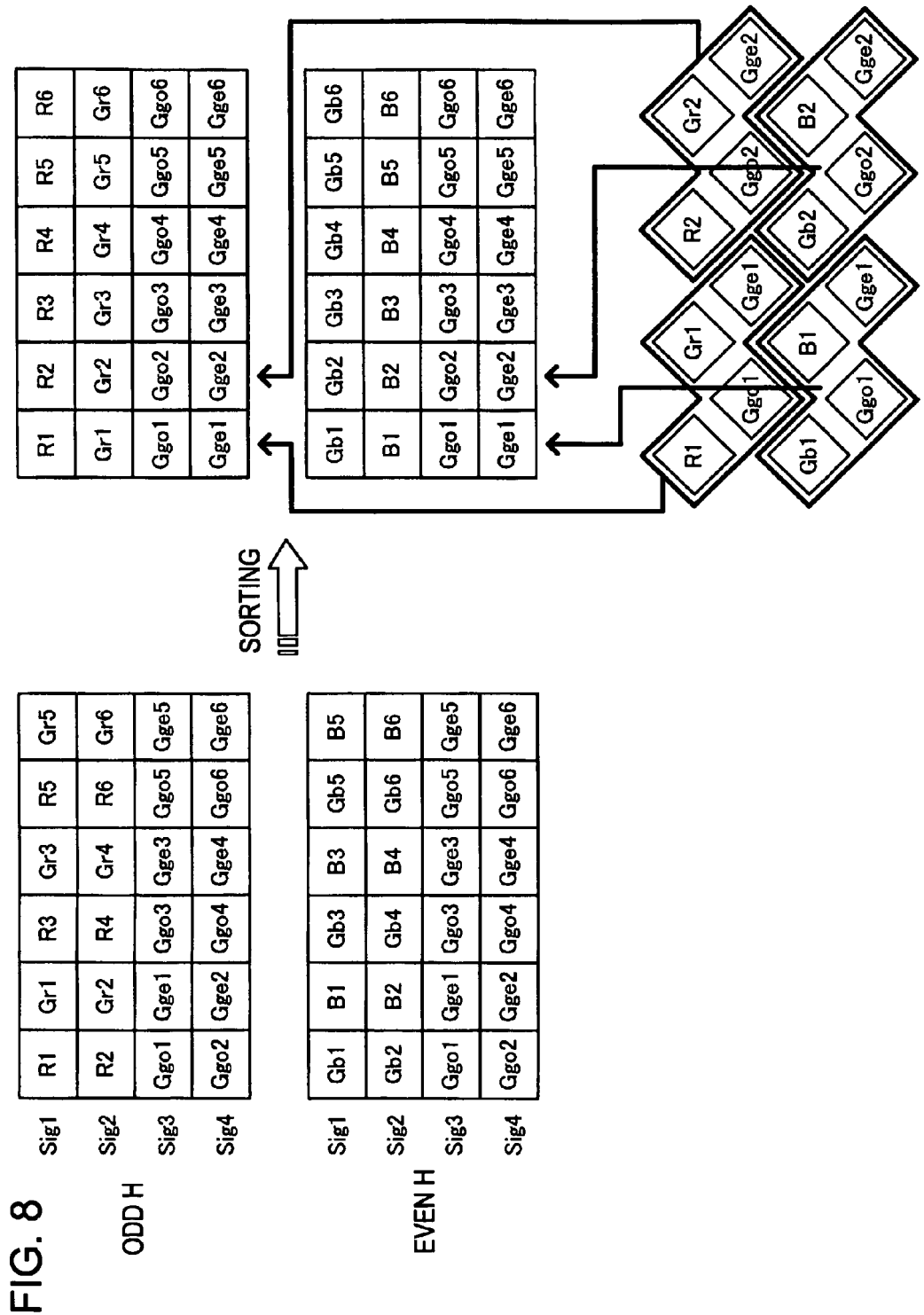
FIG. 8 illustrates examples of color sequences before and after a sort processing unit carries out a sort operation.

FIG. 8 illustrates examples of color sequences before and after the sort processing unit 21 carries out a sort operation. In this example, a color sequence is shown when 8-channel signals are multiplexed in the MUX type A at a readout time.

During an odd H period, R and Gr filter components alternately appear in the multiplexed signal Sig1 from the AFE circuit 13. Similarly, in the multiplexed signals Sig2 to Sig4, different filter components alternately appear. The sort processing unit 21 sorts such image signals by filter component, as shown in the right section of FIG. 8, so that R, Gr, Ggo, and Gge filter components are sorted into the corresponding channels and are then output. Additionally, during an even H period, the multiplexed signals Sig1 to Sig4 are sorted so that Gb, B, Ggo, and Gge filter components are sorted into the corresponding output channels. Thus, in the camera signal processing unit 22, as shown in the lower right section of FIG. 8, a combination of spatially adjacent pixels (e.g., R1, Ggo1, Gr1, and Gge1) in the color filter arrangement can be processed in parallel in one clock cycle.

Here, in the output signal from the AFE circuit 13, a predetermined repeated pattern of the filter components appears in accordance with the readout operation. In this embodiment, the same pattern appears every H period. For example, in the odd H period, the pattern of R, R, Ggo, Ggo, Gr, Gr, Gge, and Gge becomes the repeated pattern. If the number of filter components contained in one of the repeated patterns (four: R, Ggo, Gr, and Gge or four: Gb, Ggo, B1, and Gge in this example) or an integral multiple of that number is equal to the number of the output channels of the sort processing unit 21, the output channels for the digital signal processing circuit 14 can be assigned to the filter components in a one-to-one fashion. Thus, the digital signal processing circuit 14 can process signals of different filter components that are present at spatially close positions in parallel, and therefore, the processing procedure and the circuit configuration of the digital signal processing circuit 14 can be simplified.

Figure 9:
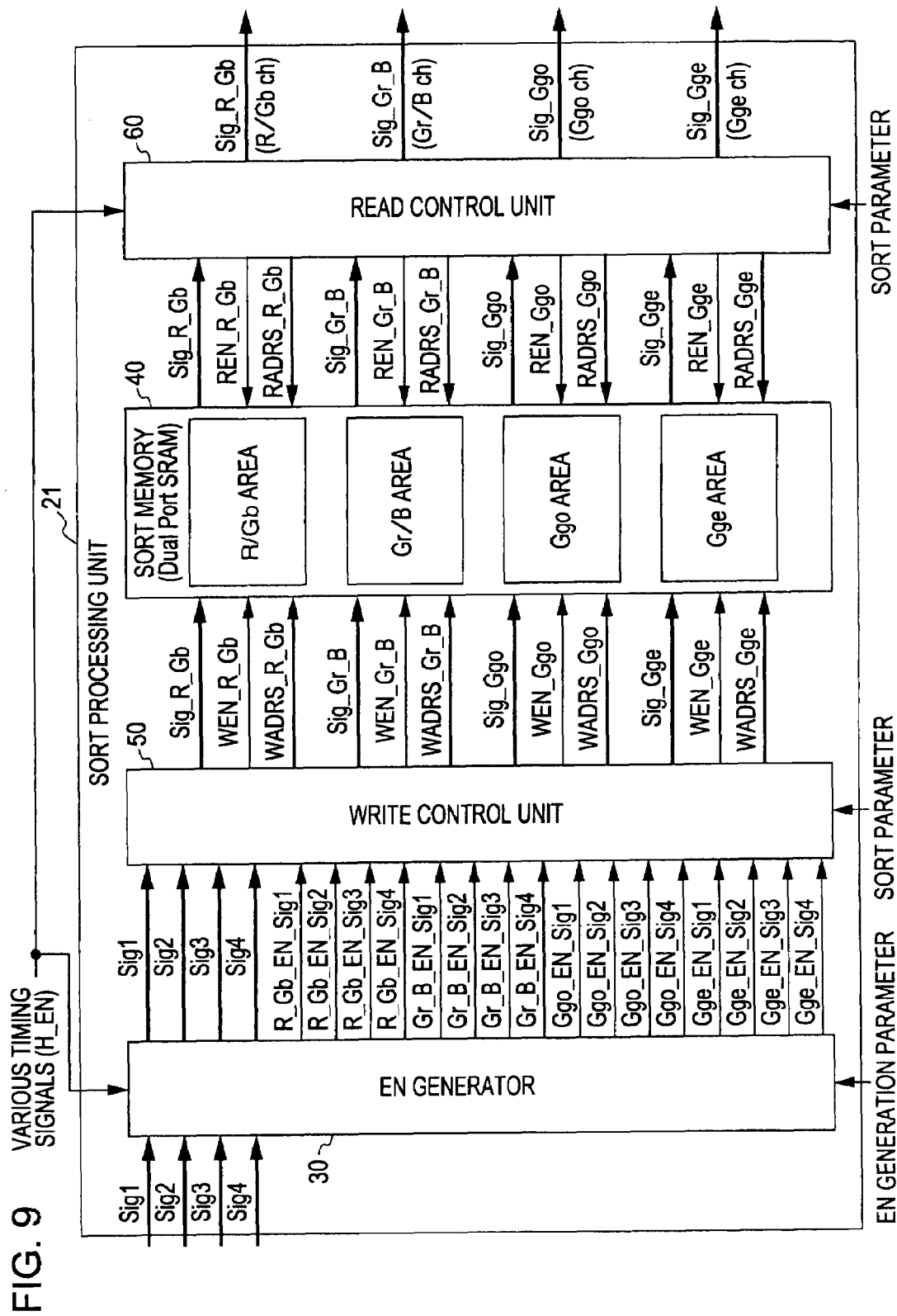
FIG. 9 is a block diagram of the internal configuration of the sort processing unit.

The internal configuration of the sort processing unit 21 is described in detail next. FIG. 9 is a block diagram of the internal configuration of the sort processing unit 21.

As shown in FIG. 9, the sort processing unit 21 includes an enable signal generator (EN generator) 30, a sort memory 40, a write control unit 50 for the sort memory 40, and a read control unit 60 for the sort memory 40.

The EN generator 30 generates an enable signal indicating times at which signals corresponding to the R or Gb, Gr or B, Ggo, and Gge components appear in each of the multiplexed signals Sig1 to Sig4 from the AFE circuit 13. The EN generator 30 then outputs the enable signals to the write control unit 50. The times at which R or Gb appears in the multiplexed signals Sig1 to Sig4 are determined by enable signals R_Gb_EN_Sig1 to R_Gb_EN_Sig4. Similarly, the times at which Gr or B appears in the multiplexed signals Sig1 to Sig4 are determined by enable signals Gr_B_EN_Sig1 to Gr_B_EN_Sig4. The times at which Ggo appears in the multiplexed signals Sig1 to Sig4 are determined by enable signals Ggo_EN_Sig1 to Ggo_EN_Sig4. The times at which Gge appears for the multiplexed signals Sig1 to Sig4 are determined by enable signals Gge_EN_Sig1 to Gge_EN_Sig4.

The EN generator 30 sets these enable signals during the horizontal effective period in which an enable signal H_EN from the SG 24 is at the H level depending on a control parameter (an EN generation parameter) specified by the camera control circuit 15. At the same time, the EN generator 30 delays the multiplexed signals Sig1 to Sig4 received from the AFE circuit 13 in synchronization with the enable signals and outputs the multiplexed signals Sig1 to Sig4 to the write control unit 50.

The sort memory 40 is composed of, for example, a dual port static RAM (SRAM) that is capable of writing and reading data at the same time. The entire storage area of the sort memory 40 is divided into storage areas for the R/Gb, Gr/B, Ggo, and Gge filter components.

The write control unit 50 sorts the multiplexed signals Sig1 to Sig4 input via the EN generator 30 on the basis of the enable signals input from the EN generator 30 so as to generate signals Sig_R_Gb, Sig_Gr_B, Sig_Ggo, and Sig_Gge sorted by filter component. Additionally, the write control unit 50 generates write-enable signals WEN_R_Gb, WEN_Gr_B, WEN_Ggo, and WEN_Gge and write addresses WADRS_R_Gb, WADRS_Gr_B, WADRS_Ggo, and WADRS_Gge for each output channel and outputs these signals and addresses to the sort memory 40, so that the signals Sig_R_Gb, Sig_Gr_B, Sig_Ggo, and Sig_Gge are written to the storage areas corresponding to the filter components.

The read control unit 60 outputs read-enable signals REN_R_Gb, REN_Gr_B, REN_Ggo, and REN_Gge and read addresses RADRS_R_Gb, RADRS_Gr_B, RADRS_Ggo, and RADRS_Gge to the sort memory 40 so as to read out the signals Sig_R_Gb, Sig_Gr_B, Sig_Ggo, and Sig_Gge, which are separated signals for the corresponding filter components. The read control unit 60 delivers the readout signals to the camera signal processing unit 22.

The sort processing unit 21 sorts the input multichannel image signals by filter component into the corresponding storage areas of the sort memory 40. By controlling the read and write addresses of the sort memory 40 and the times to read and write the sorted signals, image signals having a filter component sequence that is always constant required for the downstream camera signal processing unit 22 can be generated.

Figure 10:
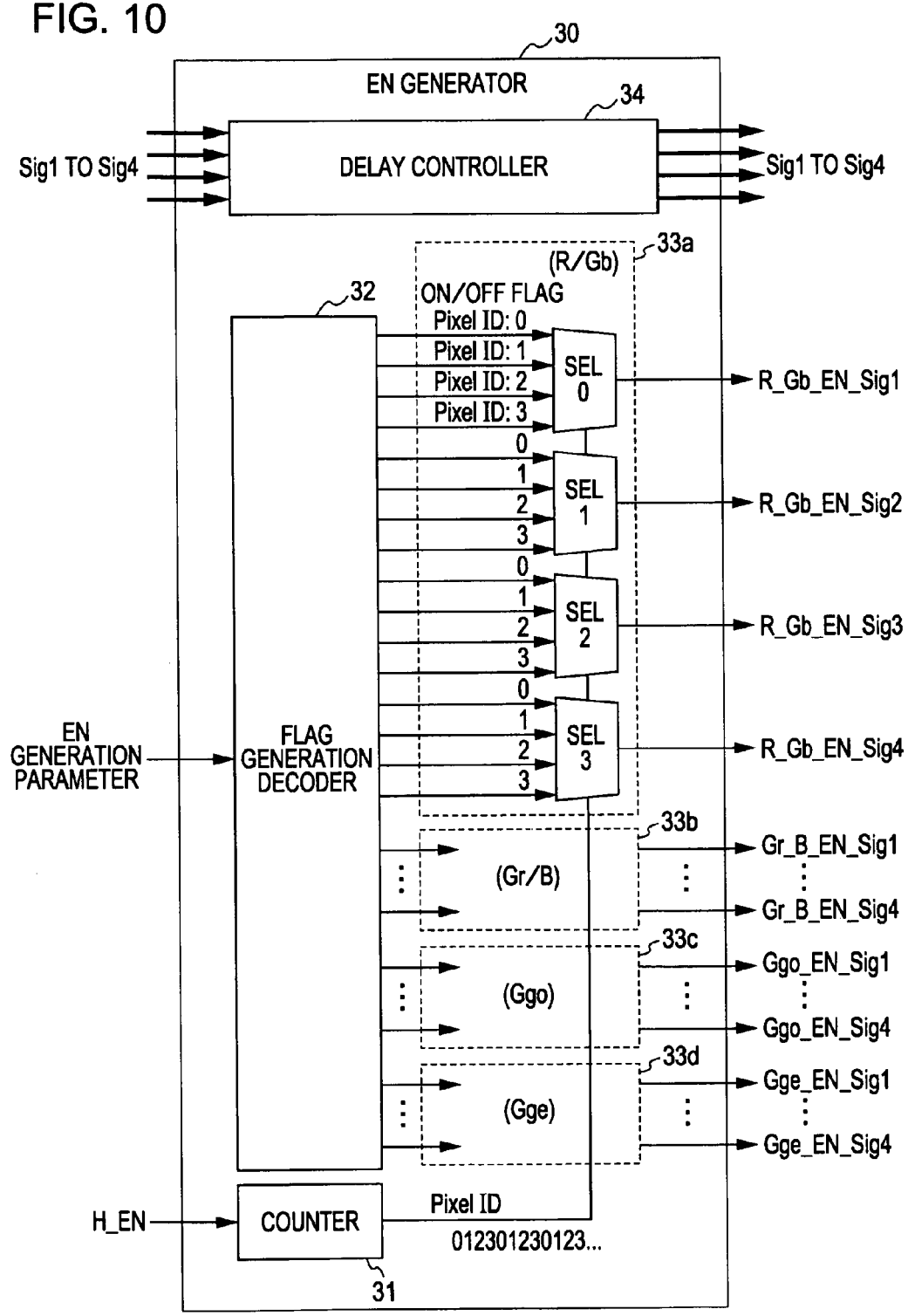
FIG. 10 is a block diagram of the internal configuration of an EN generator.

FIG. 10 is a block diagram of the internal configuration of the EN generator 30.

As shown in FIG. 10, the EN generator 30 includes a counter 31, a flag generation decoder 32, selector groups 33a to 33d, each corresponding to one of the filter components, and a delay controller 34.

The counter 31 generates a pixel ID during the horizontal effective period in which the enable signal H_EN is at the H level. Thereafter, the counter 31 delivers that pixel ID to the selector groups 33a to 33d. The pixel ID is an identification number assigned to a pixel signal of the multiplexed signals Sig1 to Sig4 every time the pixel signal is input. In this embodiment, the numbers "0" to "3" are sequentially and repeatedly used. That is, the counter 31 starts counting from a number of "0" at the start of the horizontal effective period. Subsequently, the counter 31 increments the number by one repeatedly between "0" and "3" in synchronization with a pixel clock of the multiplexed signals Sig1 to Sig4.

Here, the number of repetitions of the pixel ID is determined by the number of repetitions of the filter component in each of the multiplexed signals Sig1 to Sig4. In the present embodiment, as will be shown in FIGS. 11 through 17 below, the number of repetitions of the filter component is "2" or "4". Therefore, the number of repetitions of the pixel ID is determined to be "4". To support color sequences having different numbers of repetitions of the filter component, the number of repetitions of the pixel ID can be determined to be the common multiple of these numbers of repetitions of the filter component. Alternatively, the image sensor may have a configuration so that the camera control circuit 15 changes the number of repetitions of the counter 31 for each of the color sequences.

The flag generation decoder 32 outputs an ON/OFF flag for each channel of the multiplexed signals Sig1 to Sig4 and for each pixel ID in the selector groups 33a to 33d on the basis of the EN generation parameter from the camera control circuit 15. The ON/OFF flag is set to the H level when the corresponding filter component appears.

Here, the EN generation parameter is information on the filter components in the multiplexed signals Sig1 to Sig4. As described above, since the number of repetitions of the filter component in the multiplexed signals Sig1 to Sig4 corresponds to the number of repetitions of the pixel ID, the EN generation parameter contains the same number of information items about filter components of each signal as the number of pixel IDs.

The flag generation decoder 32 decodes the EN generation parameter to generate the ON/OFF flag, which indicates the appearance of one filter component, for each pixel ID. The flag generation decoder 32 delivers these ON/OFF flags for the R/Gb, Gr/B, Ggo, and Gge filter components to the selector groups 33a to 33d, respectively. It is noted that any configuration of the flag generation decoder 32 can be employed as long as that configuration can set the ON/OFF flags in accordance with the color sequences of the multiplexed signal Sig1 to Sig4 using the EN generation parameter from the camera control circuit 15. For example, the camera control circuit 15 may directly control the ON/OFF flags.

Each of the selector groups 33a to 33d includes four selectors SEL0 to SEL3. Each of the selectors SEL0 to SEL3 separately receives the ON/OFF flags for the pixel IDs corresponding to the same filter component and the same signal channel (i.e., either one of the multiplexed signals Sig1 to Sig4). Subsequently, each of the selectors SEL0 to SEL3 selects the input signal corresponding to the pixel ID from the counter 31 and outputs the selected input signal.

Thus, for example, the enable signals R_Gb_EN_Sig1 output from the selector SEL0 of the selector group 33a indicates the appearance of the R/Gb component for each clock cycle. Similarly, the enable signals R_Gb_EN_Sig2 to R_Gb_EN_Sig4 indicate the appearance of the R/Gb component in the multiplexed signals Sig2 to Sig4 for each clock cycle. Furthermore, similar enable signals that indicate the appearances of the Gr/B, Ggo, and Gge components are output from the selector groups 33b to 33d, respectively.

The delay controller 34 delays the multiplexed signals Sig1 to Sig4 received from the AFE circuit 13 so that the enable signals output from the selector groups 33a to 33d coincide with the corresponding pixel signals in the multiplexed signals Sig1 to Sig4 in terms of output timing.

The specific examples of the enable signals output from the EN generator 30 in accordance with variations in color sequence are described with reference to FIGS. 11 to 17. In FIGS. 11 to 17, for simplicity, the numbers of pixels in all of the horizontal effective periods are the same. However, in practice, no limitation is placed on the number of pixels.

Figure 11:
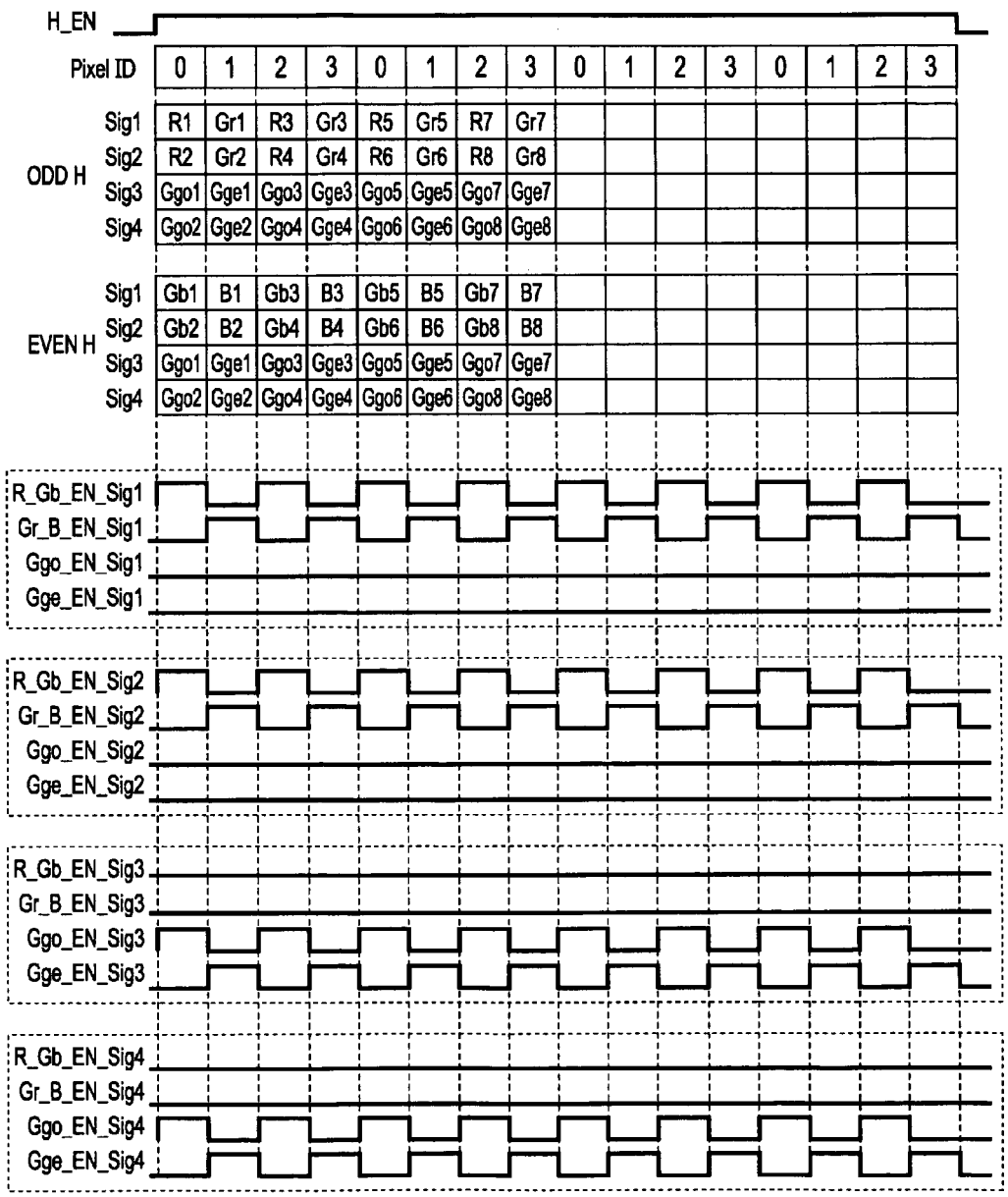
FIG. 11 illustrates color sequences and enable signals in the MUX type A when the number of readout channels of an image sensor is "8"
Figure 12:
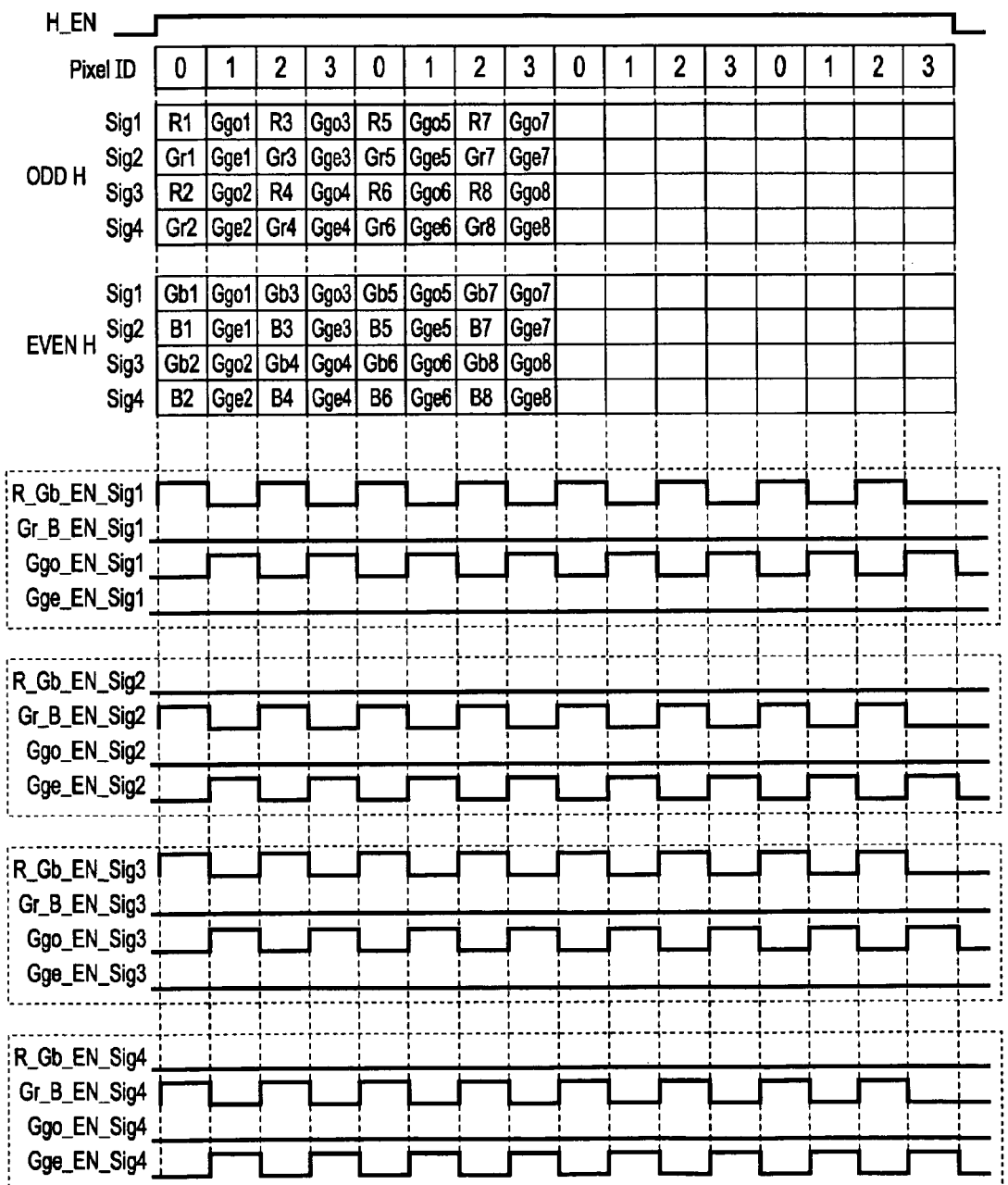
FIG. 12 illustrates color sequences and enable signals in the MUX type B when the number of readout channels of an image sensor is "8"

FIGS. 11 and 12 illustrate the color sequences and enable signals in the MUX type A and those in the MUX type B, respectively, when the number of readout channels of an image sensor is "8".

As shown in FIG. 11, for example, in the multiplexed signal Sig1, the R component (in an odd H period) or Gb component (in an even H period) appears when the pixel ID is "0" and "2", whereas the Gr component (in an odd H period) or B component (in an even H period) appears when the pixel ID is "1" and "3". Accordingly, the enable signal R_Gb_EN_Sig1 is at the H level when the pixel ID is "0" and "2", whereas the enable signal Gr_B_EN_Sig1 is at the H level when the pixel ID is "1" and "3". In addition, since the Ggo and Gge components do not appear in the multiplexed signal Sig1, the enable signals Ggo_EN_Sig1 and Gge_EN_Sig1 are always at the L level.

In contrast, as shown in FIG. 12, when the MUX type B is applied, the R component (in an odd H period) or Gb component (in an even H period) appears in the multiplexed signal Sig1, as in the above-described MUX type. However, when the pixel ID is "1" and "3", the Ggo component appears and the Gr and Gge components do not appear. Accordingly, the enable signal Ggo_EN_Sig1 is at the H level when the pixel ID is "1" and "3", whereas the enable signals Gr_B_EN_Sig1 and Gge_EN_Sig1 are always at the L level.

Figure 13:
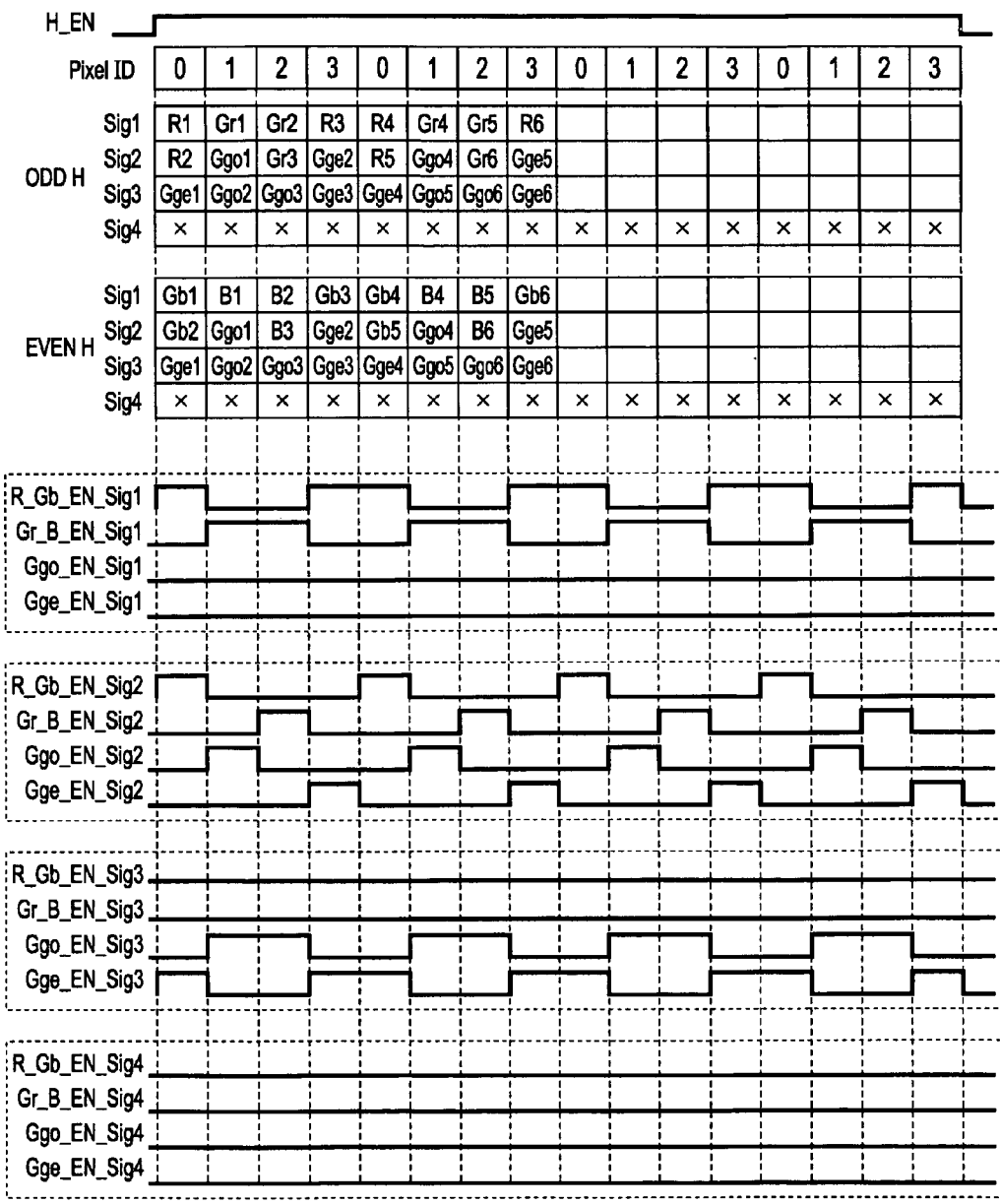
FIG. 13 illustrates color sequences and enable signals in the MUX type A when the number of readout channels of an image sensor is "6"
Figure 14:
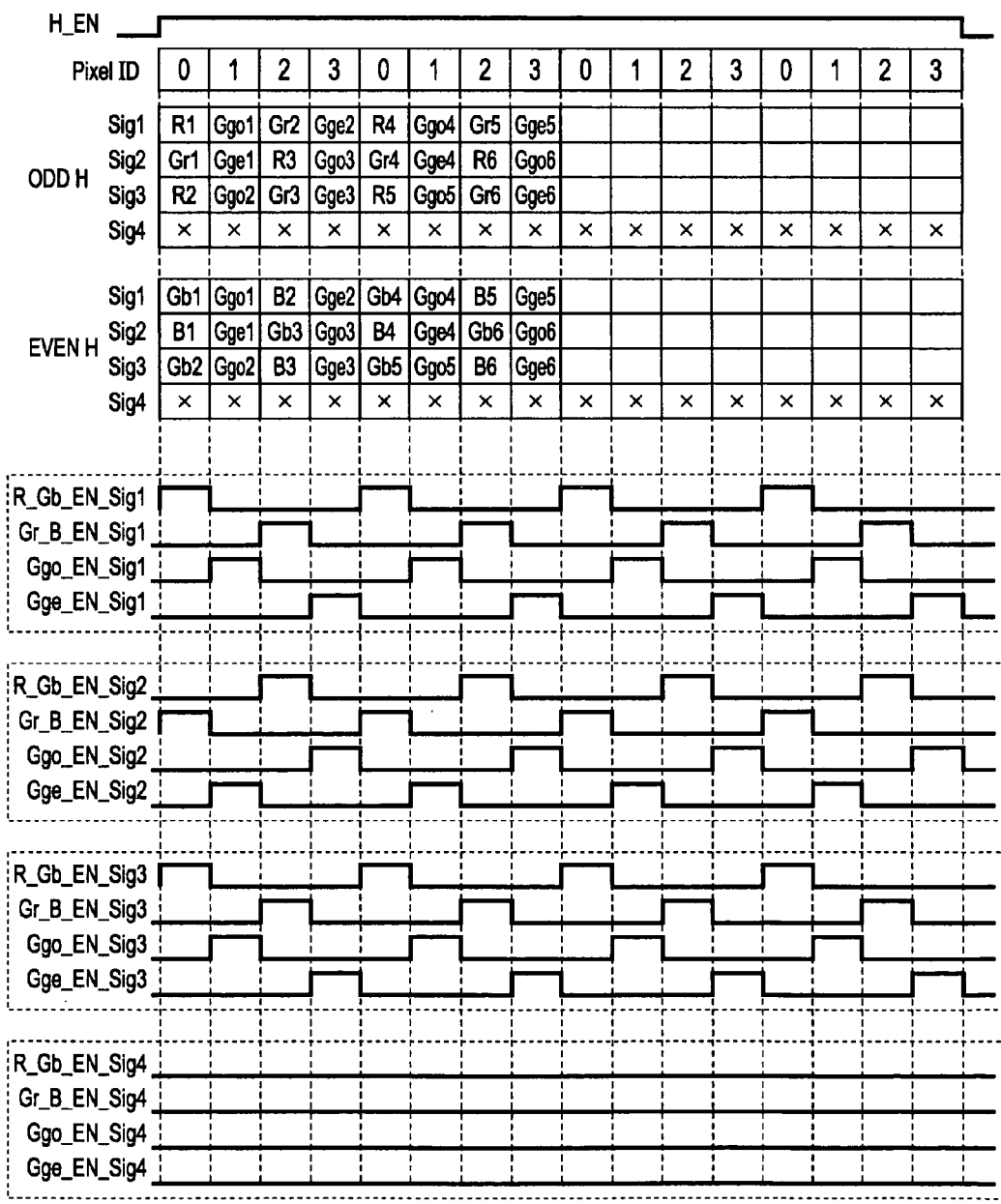
FIG. 14 illustrates color sequences and enable signals in the MUX type B when the number of readout channels of an image sensor is "6"

FIGS. 13 and 14 illustrate the color sequences and enable signals in the MUX type A and those in the MUX type B, respectively, when the number of readout channels of an image sensor is "6".

As shown in FIGS. 13 and 14, in the case of 6-channel readout, the number of channels of the image signals is 3 after the image signals are multiplexed, and therefore, an image signal is not transmitted to the multiplexed signal Sig4.

In the case shown in FIG. 13, in the multiplexed signal Sig1, two components R and Gr appear every two pixels in the odd H period. In the even H period, two components Gb and B appear every two pixels. Additionally, since, in the multiplexed signal Sig2, four components R, Ggo, Gr, and Gge repeatedly appear in the odd H period, the enable signals R_Gb_EN_Sig2, Gr_B_EN_Sig2, Ggo_EN_Sig2, and Gge_EN_Sig2 corresponding to the multiplexed signal sig2 are at the H level every four pixels.

In contrast, as shown in FIG. 14, when the MUX type B is applied, all the four components R, Ggo, Gr, and Gge appear in all the multiplexed signals Sig1 to Sig3 (in an odd H period). Therefore, all the enable signals R_Gb_EN_Sig1-Sig3, Gr_B_EN_Sig1-Sig3, Ggo_EN_Sig1-Sig3, and Gge_EN_Sig1-Sig3 corresponding to these filter components are at the H level every four pixels.

Figure 15:
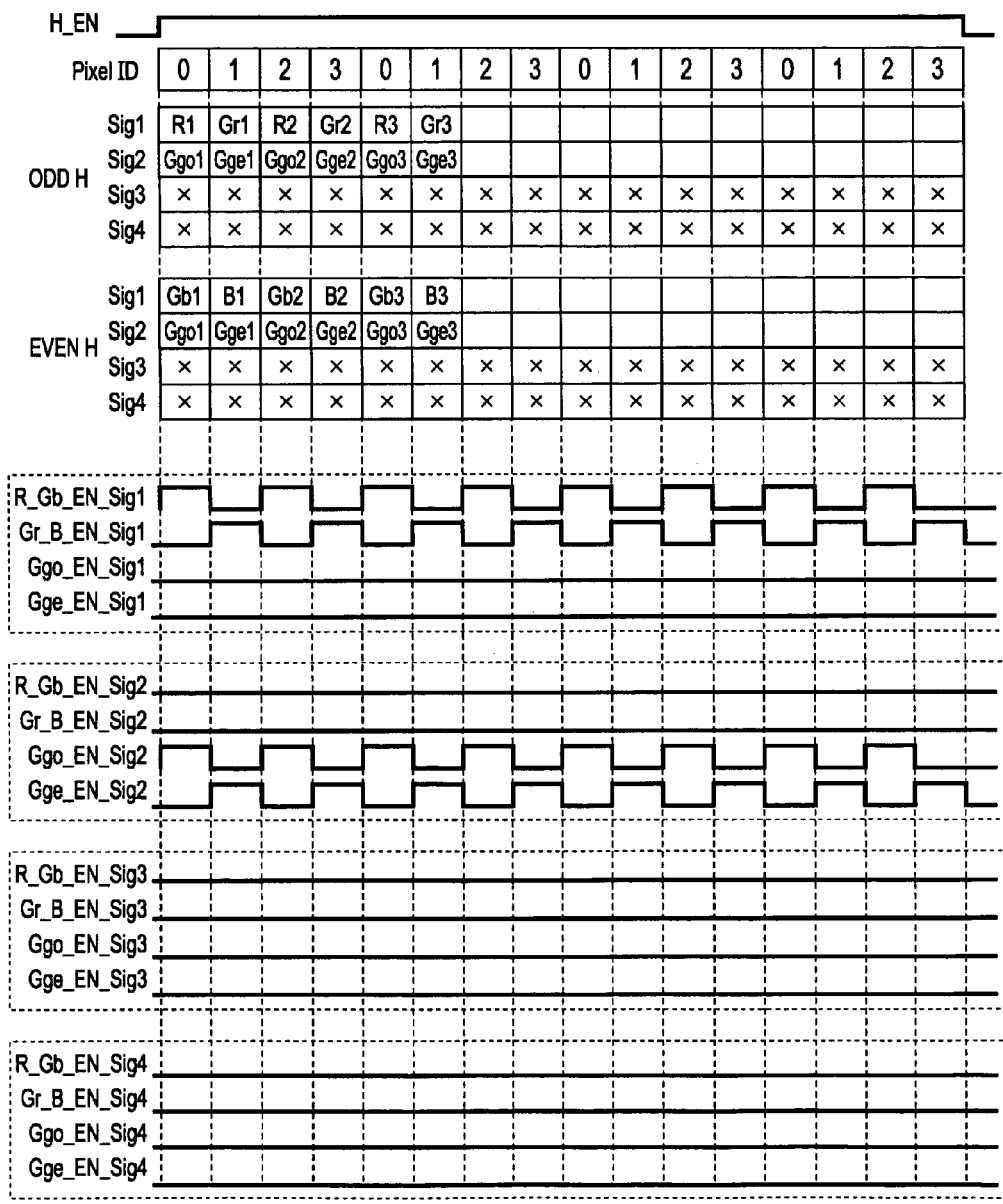
FIG. 15 illustrates color sequences and enable signals in the MUX type A when the number of readout channels of an image sensor is "4"
Figure 16:
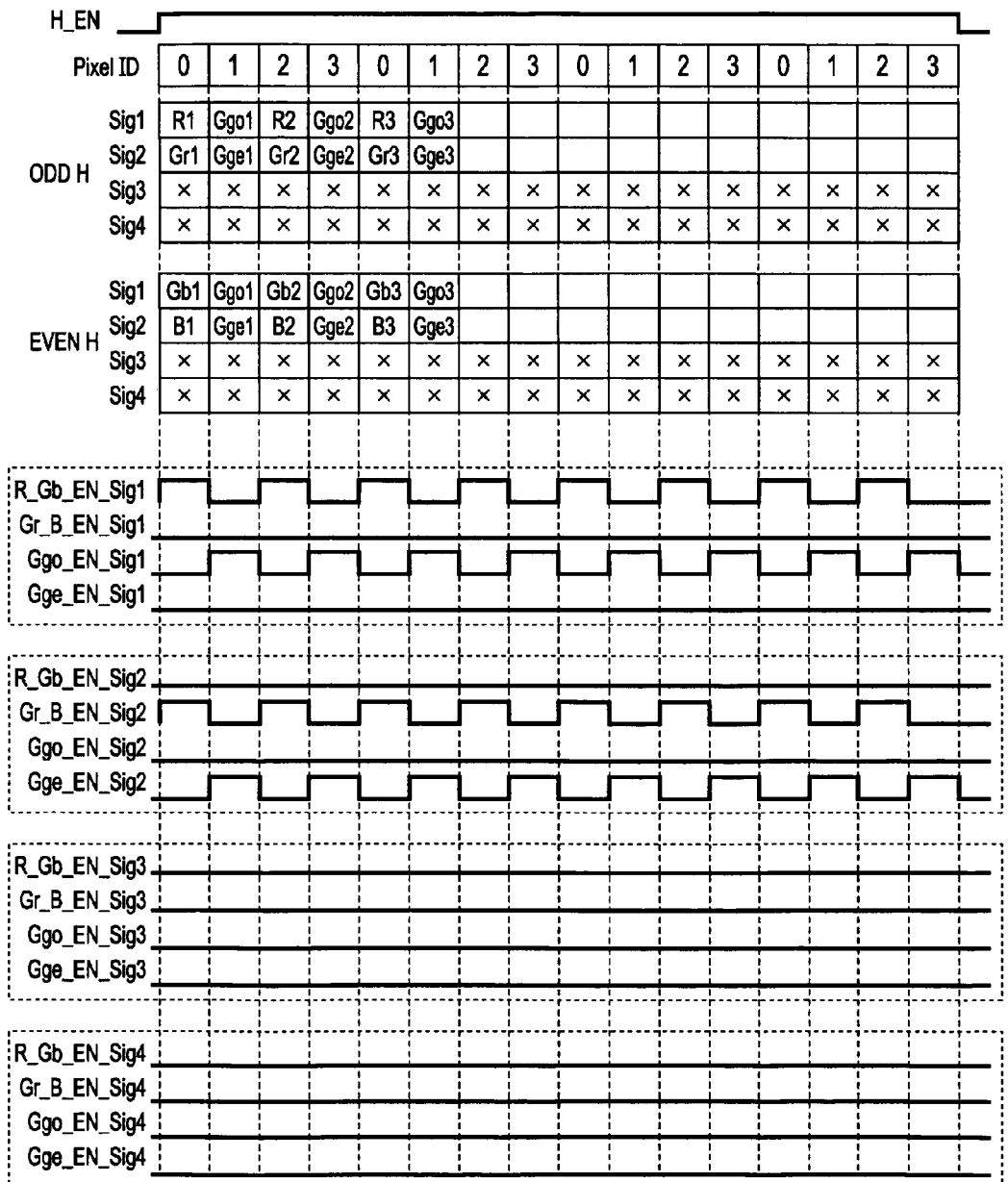
FIG. 16 illustrates color sequences and enable signals in the MUX type B when the number of readout channels of an image sensor is "4"

FIGS. 15 and 16 illustrate the color sequence and enable signals in the MUX type A and those in the MUX type B, respectively, when the number of readout channels of an image sensor is "4".

As shown in FIGS. 15 and 16, in the case of 4-channel readout, the number of channels of the image signals is 2 after the image signals are multiplexed, and therefore, image signals are not transmitted to the multiplexed signals Sig3 and Sig4. Additionally, in the case of the 4-channel readout, both for the MUX types A and B, two components alternately appear in each of the multiplexed signals Sig1 and Sig2. However, the combinations of the two components are different for the MUX types A and B.

Figure 17:
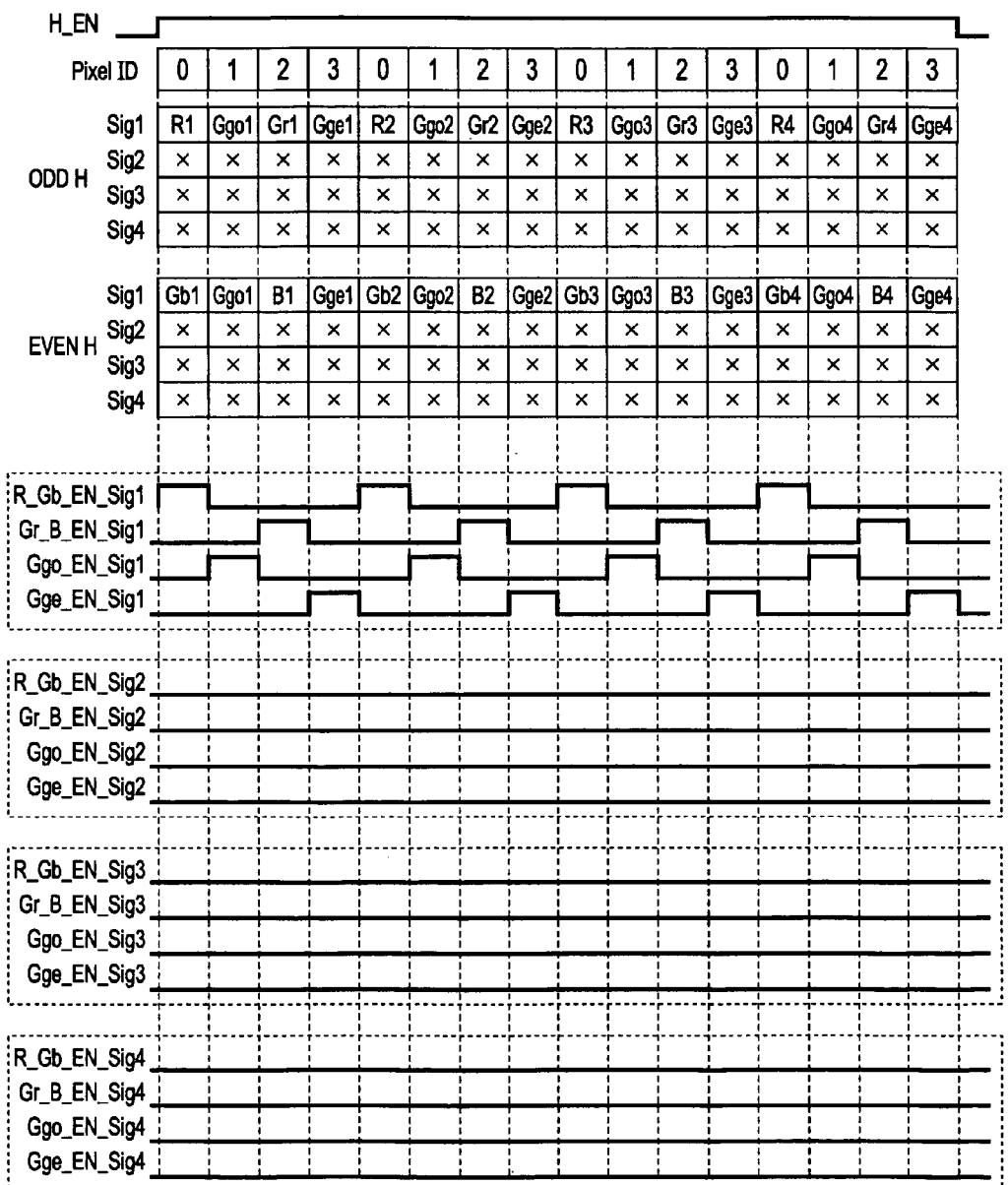
FIG. 17 illustrates color sequences and enable signals when the number of readout channels of an image sensor is "2"

FIG. 17 illustrates the color sequence and enable signals in the MUX type A and those in the MUX type B when the number of readout channels of an image sensor is "2".

As shown in FIG. 17, in the case of 2-channel readout, an image signal is transmitted to only one channel after the image signals are multiplexed, and therefore, it follows that the four filter components repeatedly appear in the same order regardless of the MUX type.

As shown in FIGS. 11 to 17, the combination of the number of readout channels of the image sensor and the method of multiplexing produces many types of color sequence of the multiplexed signals Sig1 to Sig4. The EN generator 30 having the above-described configuration can set the EN generation parameters corresponding to these many types of color sequence so as to freely output pulse signals (i.e., the enable signals) indicating the appearance timings of the filter components.

Figure 18:
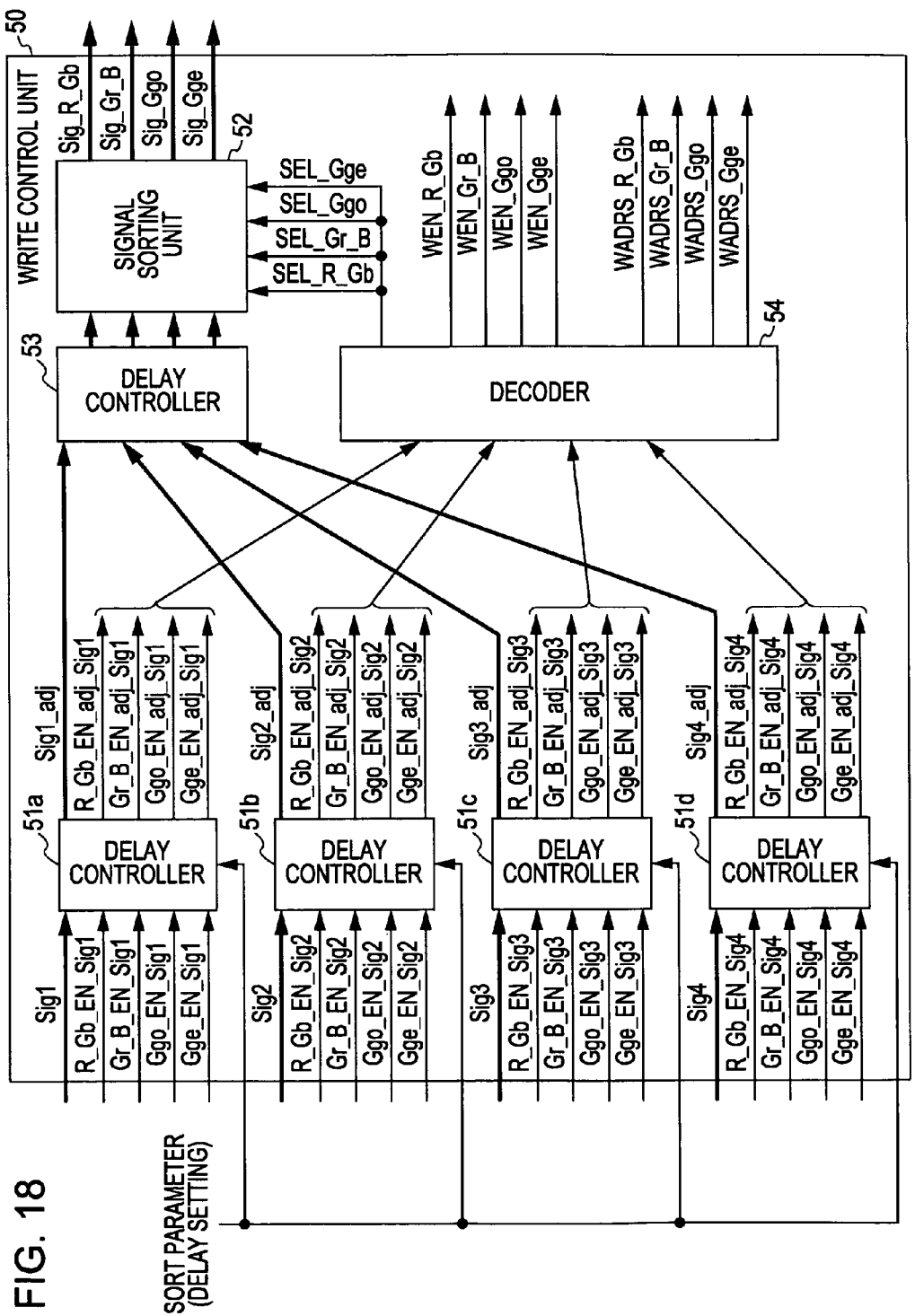
FIG. 18 is a block diagram of the internal configuration of a write control unit.

FIG. 18 is a block diagram of the internal configuration of the write control unit 50.

As shown in FIG. 18, the write control unit 50 includes delay controllers 51a to 51d corresponding to the multiplexed signals Sig1 to Sig4, respectively, a signal sorting unit 52 for sorting the multiplexed signals Sig1 to Sig4 by filter component, a delay controller 53 for controlling the delays of the signals input to the signal sorting unit 52, and a decoder 54 for generating the write addresses in the sort memory 40.

The delay controller 51a receives, from the EN generator 30, the multiplexed signal Sig1 and the enable signals R_Gb_EN_Sig1, Gr_B_EN_Sig1, Ggo_EN_Sig1, and Gge_EN_Sig1 for the multiplexed signal Sig1. Similarly, the delay controllers 51b to 51d receive, from the EN generator 30, the multiplexed signals Sig2 to Sig4 and the enable signals for the multiplexed signals Sig2 to Sig4, respectively.

The delay controllers 51a to 51d delay the input signals for predetermined time periods in accordance with sort parameters, which are control parameters input from the camera control circuit 15. Each of the delay controllers 51a to 51d includes, for example, a plurality of flip-flop (FF) circuits connected with each other in series so as to be capable of selecting an output from each of the FF stages in accordance with the sort parameter. When the same filter components appear in the multiplexed signals Sig1 to Sig4 at the same time, each of the delay controllers 51a to 51d delays one of the signals so that the signals having the same filter components can be continuously written to the sort memory 40.

After the delay controllers 51a to 51d control the delays of the input signals, the delay controller 53 further controls delays and outputs multiplexed signals Sig1_adj to Sig4_adj to the signal sorting unit 52. The signal sorting unit 52 sorts the multiplexed signals Sig1_adj to Sig4_adj by filter component in accordance with a selection signal from the decoder 54 to generate signals Sig_R_Gb, Sig_Gr_B, Sig_Ggo, and Sig_Gge, and outputs these sorted signals to the sort memory 40. It is noted that the delay controller 53 delays the multiplexed signals Sig1_adj to Sig4_adj by predetermined time periods so that the signal sorting unit 52 is properly synchronized with the decoder 54.

The decoder 54 generates the selection signal for the signal sorting unit 52 and an address and an enable signal for writing the selected signal to the sort memory 40 on the basis of the delay-adjusted enable signals output from the delay controllers 51a to 51d.

Figure 19:
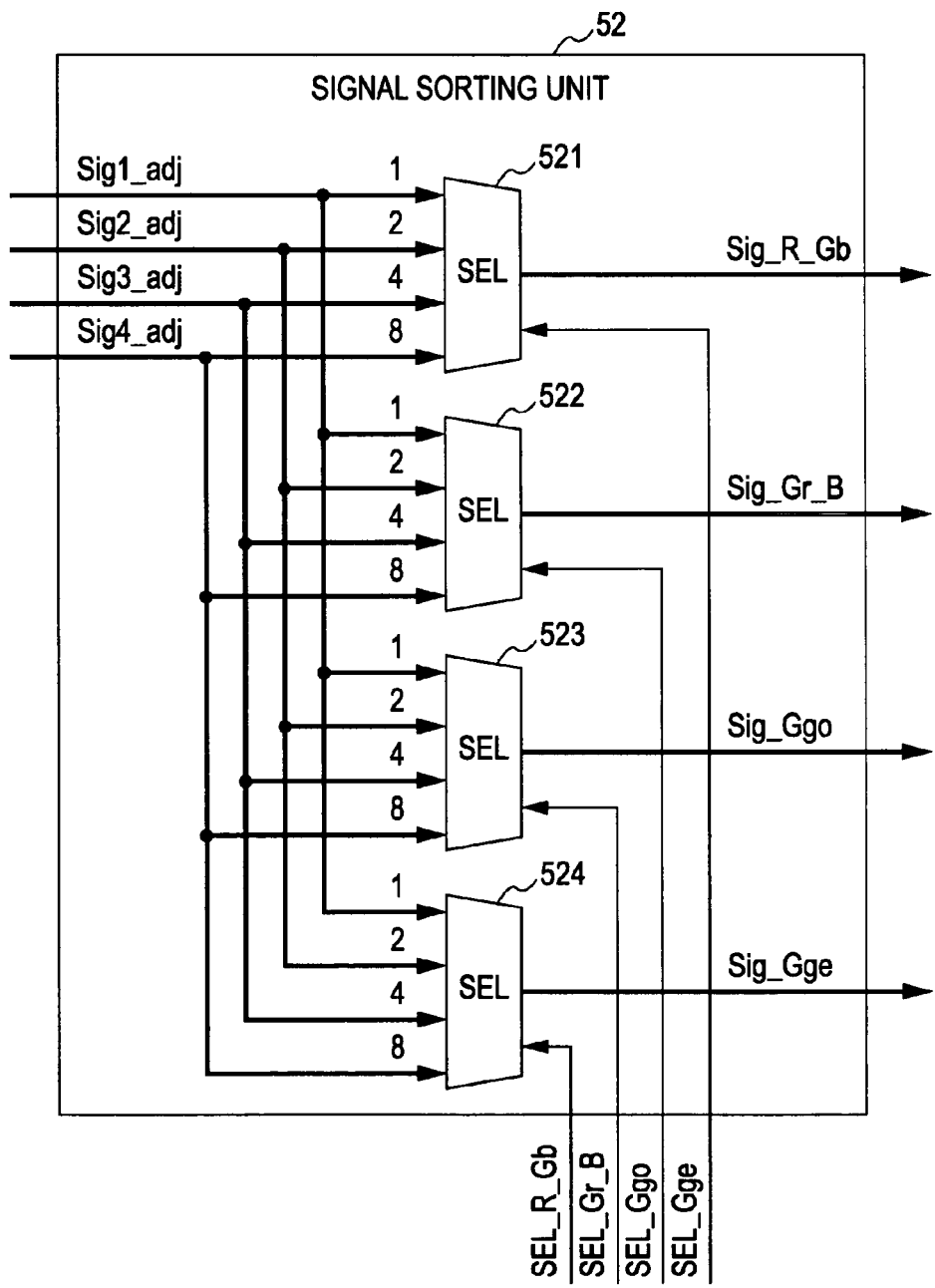
FIG. 19 is a block diagram of the internal configuration of a signal sorting unit.

FIG. 19 is a block diagram of the internal configuration of the signal sorting unit 52.

As shown in FIG. 19, the signal sorting unit 52 includes selectors 521 to 524 corresponding to the filter components R/Gb, Gr/B, Ggo, and Gre, respectively. Each of the selectors 521 to 524 receives the multiplexed signals Sig1_adj to Sig4_adj, selects one of the multiplexed signals Sig1_adj to Sig4_adj in accordance with the corresponding selection signal SEL_R_Gb, SEL_Gr_B, SEL_Ggo, or SEL_Gge from the decoder 54, and outputs the selected signal.

In FIG. 19, the numbers "1", "2", "3", "4" attached to the inputs of the selectors 521 to 524 denote numbers represented by bit strings (decimal notation) on the basis of the enable signals input to the decoder 54. As described below, the decoder 54 causes the signal sorting unit 52 to select an input channel corresponding to this number on the basis of the input enable signal. Thus, only a signal of the filter component corresponding to the number is output from each of the selectors 521 to 524.

The input multiplexed signals Sig1_adj to Sig4_adj have been already adjusted by the delay controllers 51a to 51d so that the same filter components are not input at the same time. Therefore, simply by selecting the input signal, the signal sorting unit 52 can sort the signals of all the filter components into the output channels without any loss of signals of the filter components.

Figure 20:
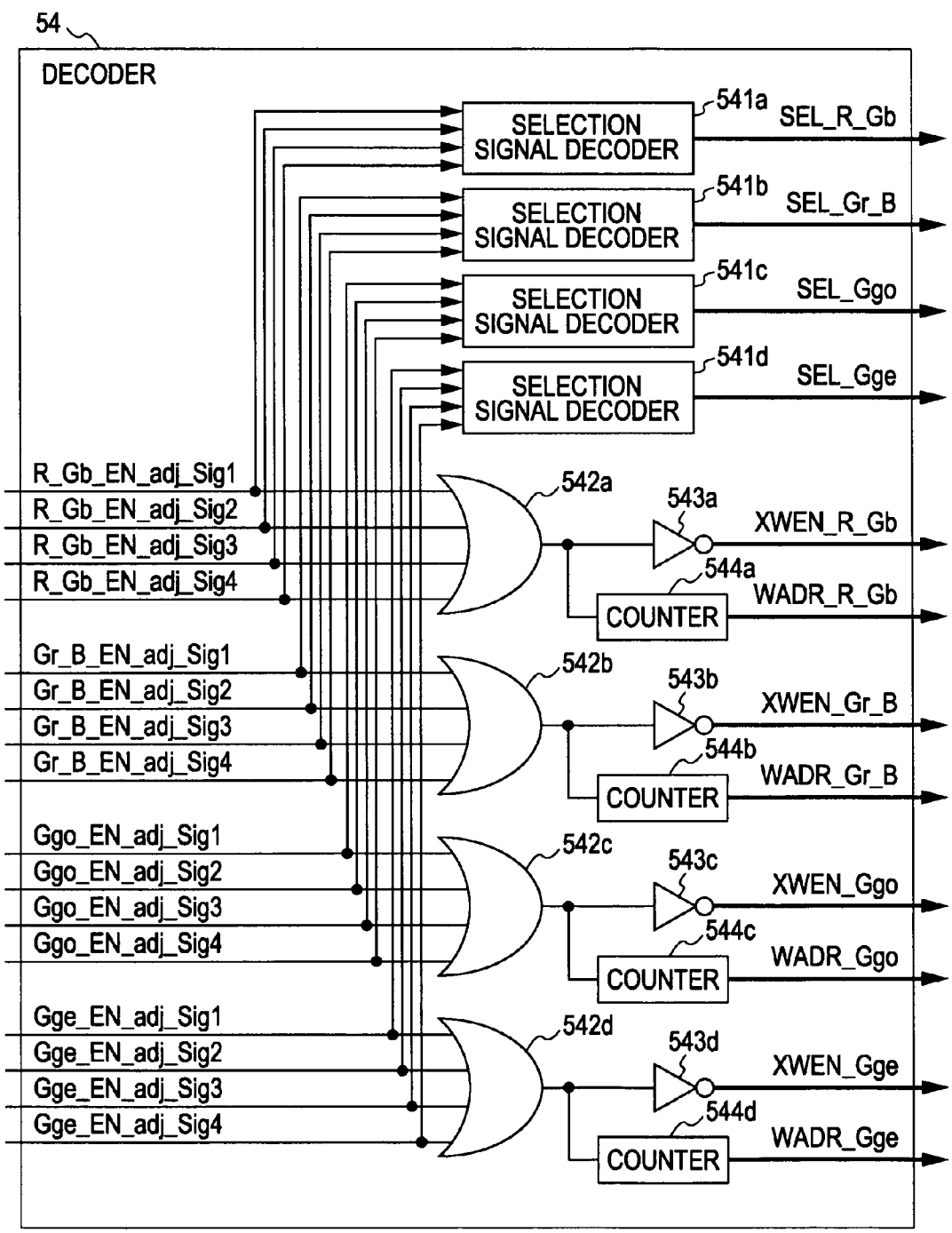
FIG. 20 is a block diagram of the internal configuration of a decoder of the write control unit.

FIG. 20 is a block diagram of the internal configuration of the decoder 54.

As shown in FIG. 20, the decoder 54 includes selection signal decoders 541a to 541d, OR gates 542a to 542d, inverters 543a to 543d, and counters 544a to 544d corresponding to the filter components R/Gb, Gr/B, Ggo, and Gge, respectively.

The selection signal decoders 541a to 541d consider the enable signals corresponding the filter components as bit strings and output the selection signals SEL_R_Gb, SEL_Gr_B, SEL_Ggo, and SEL_Gge, respectively, so that the signal sorting unit 52 can select the input channel corresponding to the number represented by the bit string. This decoding operation is described below with reference to FIGS. 21 and 22.

The OR gates 542a to 542d receive, from the delay controllers 51a to 51d, the enable signals corresponding to the signals of the filter components R/Gb, Gr/B, Ggo, and Gge, respectively. The output pulse from the OR gate 542a is input to the inverter 543a and the counter 544a. The output from the inverter 543a becomes an enable signal XWEN_R_Gb that allows a write operation to be performed to the R/Gb storage area of the sort memory 40 (here, the level L allows performance of the write operation). Additionally, the counter 544a counts the output pulses from the OR gate 542a. The count value serves as the write address of the R/Gb storage area of the sort memory 40. Circuits for the other components operate in the same manner as described above. The output pulses from the OR gates 542b to 542d are input to the inverters 543b to 543d and the counters 544b to 544d, respectively. Thus, the enable signals and write addresses of the Gr/B, Ggo, and Gge storage areas of the sort memory 40 are generated.

The specific examples of the enable signals after the delay control is performed are shown in FIGS. 21 and 22. The operations of the selection signal decoders 541a to 541d are described next with reference to FIGS. 21 and 22. FIG. 21 illustrates the decoding operation of the selection signal when the number of the readout channels of an image sensor is "8" in the MUX type A.

In this case, as shown in FIG. 11, signals including the same filter components appear in the multiplexed signals Sig1 and Sig2. Similarly, signals including the same filter components appear in the multiplexed signals Sig3 and Sig4. Therefore, in the example shown in FIG. 21, the multiplexed signals Sig2 and Sig4 are delayed by one clock cycle using the delay controllers 51b and 51d.

Here, let us consider a bit string in which the enable signals Sig1 to Sig4 after the delay control is performed are arranged from the least significant bit to the most significant bit for each filter component. For example, when, in FIG. 21, the R, Gr, Ggo, and Gge (or Gb, B, Ggo, and Gge) components appear in the multiplexed signals Sig1_adj to Sig4_adj, respectively, the bit string is "0001" for the R/Gb component, "0010" for the Gr/B component, "0100" for the Ggo component, and "1000" for the Gge component. The lower portion of FIG. 21 illustrates the values of these bit strings in decimal notation.

Since the multiplexed signals Sig1_adj to Sig4_adj do not contain the same filter component at the same time, the possible values of the bit string are "0", "1", "2", "4", and "8" in decimal notation. In addition, since the input channels of the multiplexed signals Sig1_adj to Sig4_adj are assigned to the bit string from the least significant bit to the most significant bit, it follows that the filter component corresponding to the input channel for which the bit is ON appears.

Accordingly, when the value of the bit string based on the input enable signals is "1", the selection signal decoders 541a to 541d generate a signal to instruct the signal sorting unit 52 to select the multiplexed signal Sig1_adj. When the value of the bit string is "2", the selection signal decoders 541a to 541d generate a signal to instruct the signal sorting unit 52 to select the multiplexed signal Sig2_adj. When the value of the bit string is "4", the selection signal decoders 541a to 541d generate a signal to instruct the signal sorting unit 52 to select the multiplexed signal Sig3_adj. When the value of the bit string is "8", the selection signal decoders 541a to 541d generate a signal to instruct the signal sorting unit 52 to select the multiplexed signal Sig4_adj. Additionally, when the value of the bit string is "0", the selection signal decoders 541a to 541d instructs the signal sorting unit 52 not to select any input channel.

In the above-described example, the bit strings for the components R/Gb, Gr/B, Ggo, and Gge are "1", "2", "4", and "8", respectively, when the R, Gr, Ggo, and Gge (or Gb, B, Ggo, and Gge) components appear in the multiplexed signals Sig1_adj to Sig4_adj. Therefore, the control is performed so that the selector 521 of the signal sorting unit 52 selects the multiplexed signal Sig1_adj, the selector 522 selects the multiplexed signal Sig2_adj, the selector 523 selects the multiplexed signal Sig3_adj, and the selector 524 selects the multiplexed signal Sig4_adj.

As another example, the decoding operation when the number of the readout channels of the image sensor is "6" is described next. FIG. 22 illustrates the decoding operation of the selection signal when the number of the readout channels is "6" in the MUX type A.

In this case, to prevent the same filter components from appearing at the same time, the delay of the delay controller 51b is set to one clock cycle and the delay of the delay controller 51c is set to two clock cycles. When, for example, the component R, Gr, and Ggo appear in the multiplexed signals Sig1_adj and Sig3_adj after the delay control is performed, respectively, the bit strings corresponding to these components based on the enable signals are "1000", "0100", "0010", and "0000". Accordingly, based on the selection signals from the selection signal decoders 541a to 541d, the selector 521 of the signal sorting unit 52 selects the multiplexed signal Sig1_adj, the selector 522 selects the multiplexed signal Sig3_adj, and the selector 523 selects the multiplexed signal Sig2_adj. The selector 524 does not select any multiplexed signal.

As noted above, the selection signal decoders 541a to 541d carry out the above-described simple decoding operations on the basis of the input enable signals. Thus, the signal sorting unit 52 can output an image signal for each filter component from the corresponding channel so as to store the image signal in the storage area of the sort memory 40 for the filter component.

Figure 23:
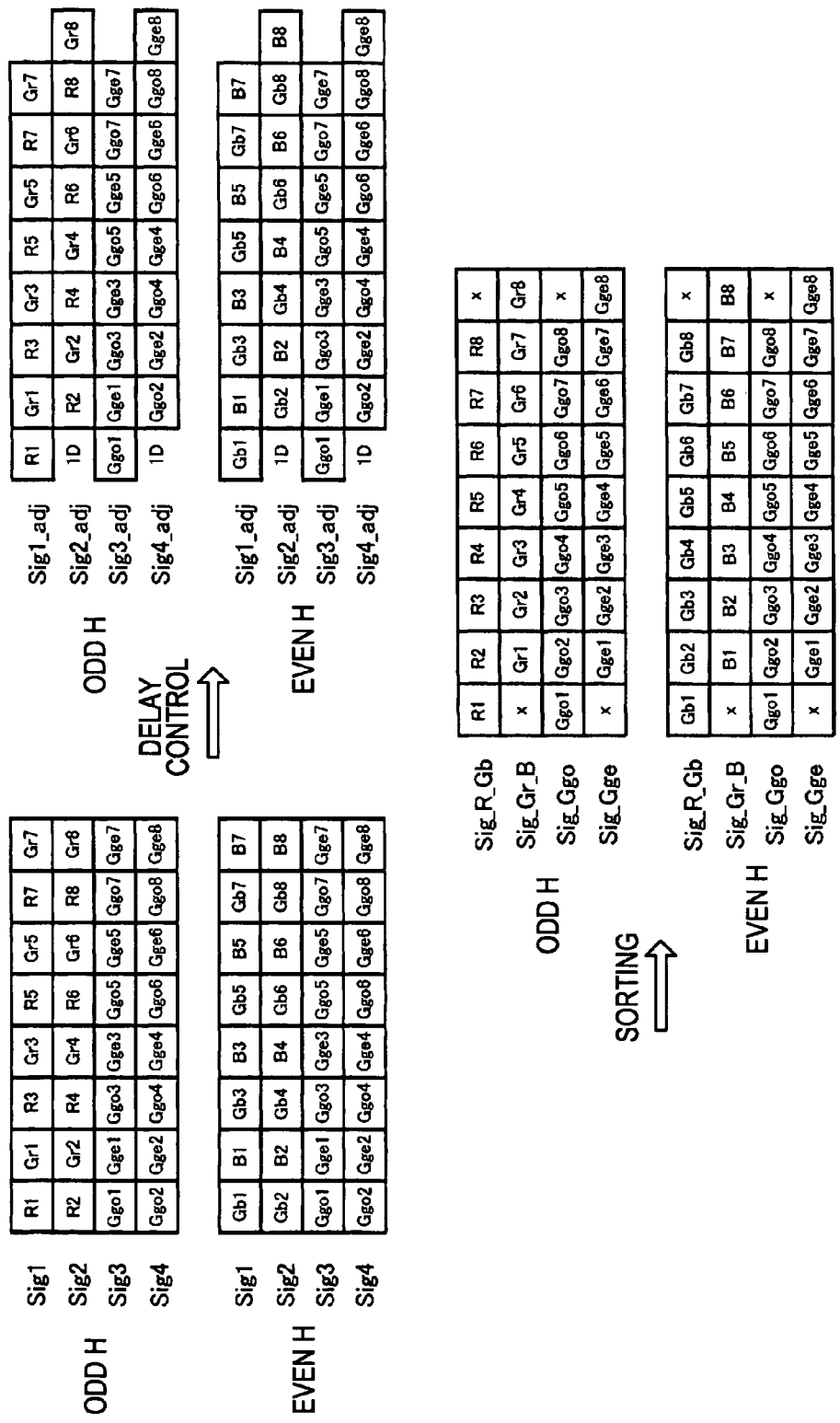
FIG. 23 illustrates the image signal arrangement when the number of the readout channels of an image sensor is "8" in the MUX type A.
Figure 24:
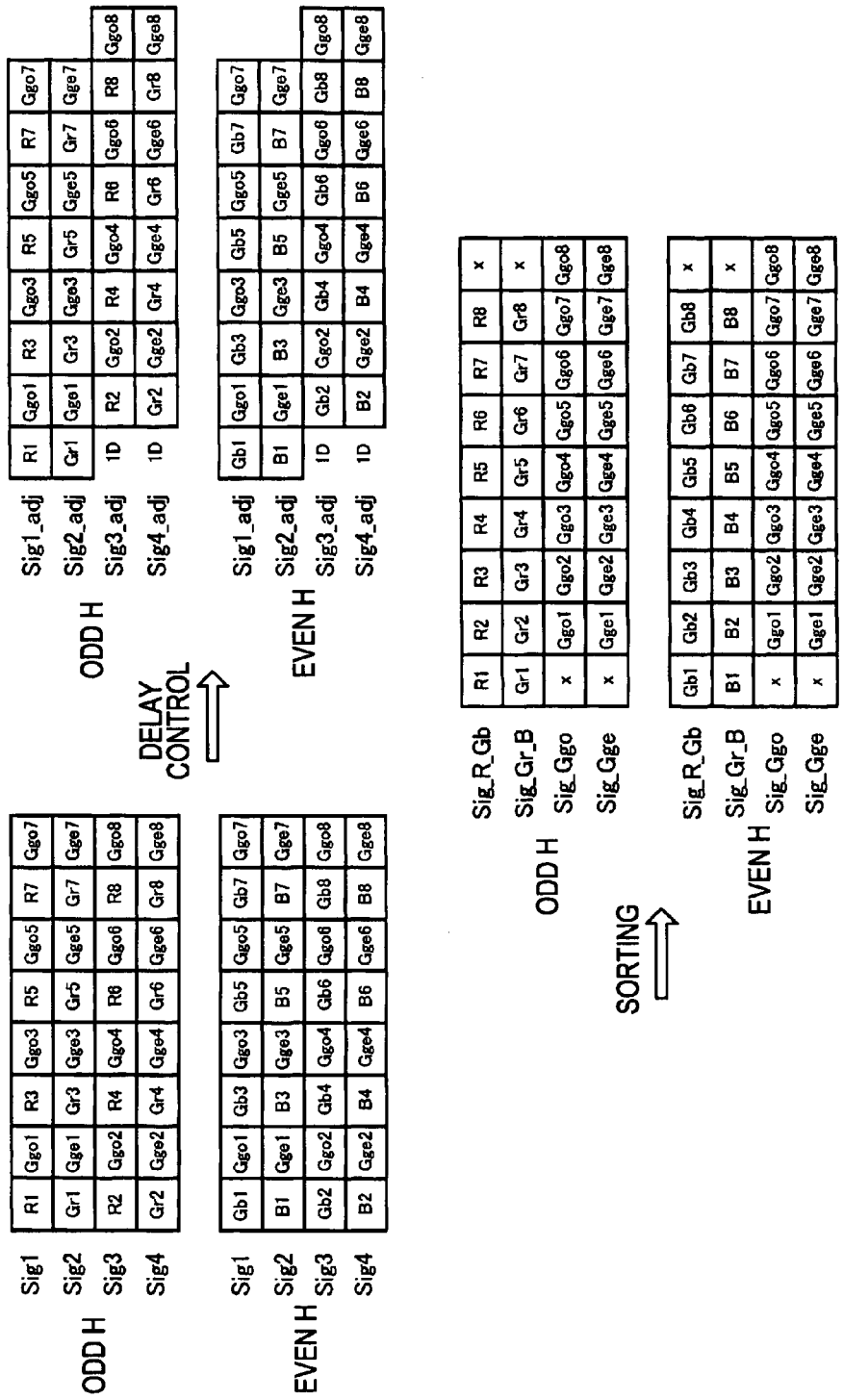
FIG. 24 illustrates the image signal arrangement when the number of readout channels of an image sensor is "8" in the MUX type B.
Figure 25:
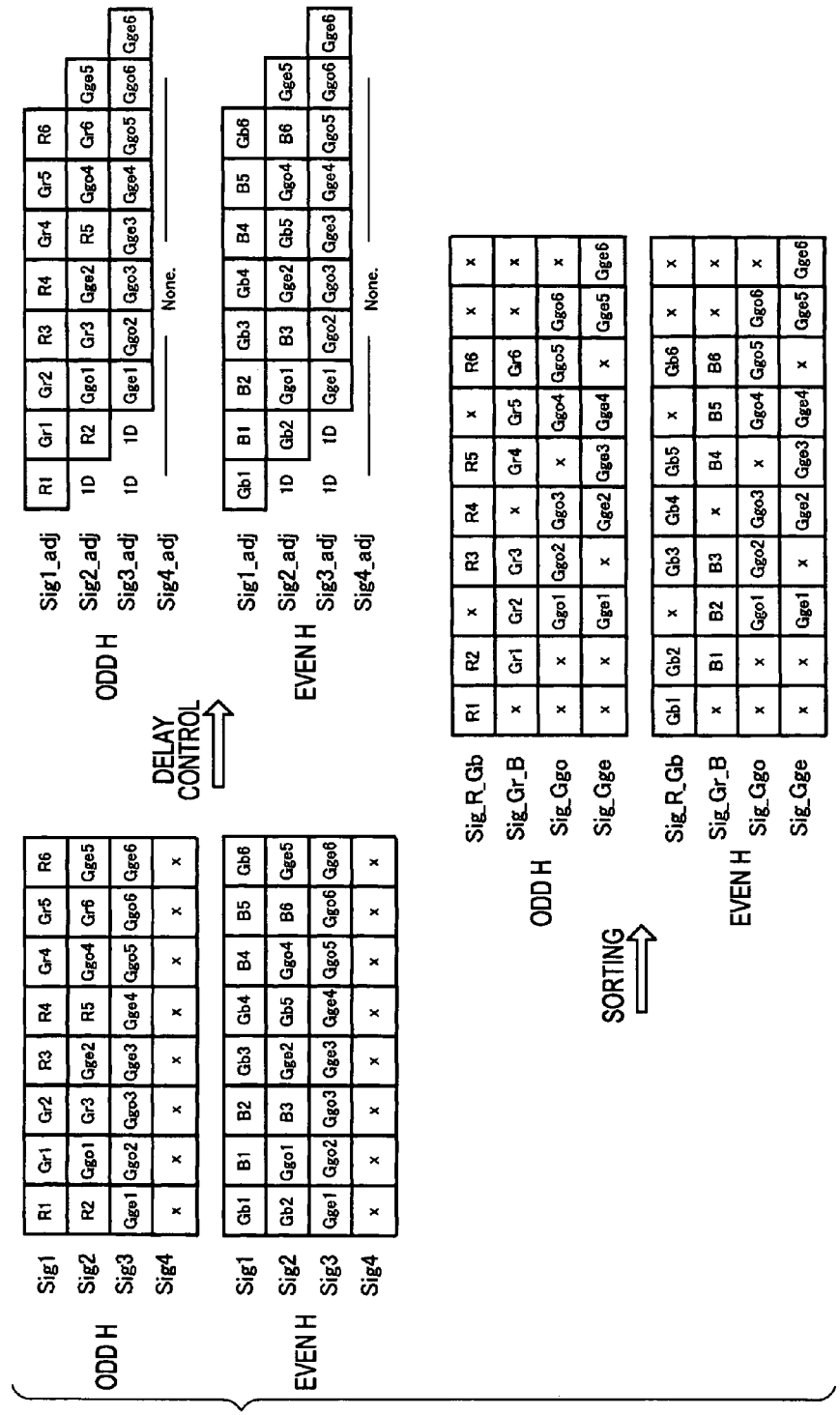
FIG. 25 illustrates the image signal arrangement when the number of readout channels of an image sensor is "6" in the MUX type A.
Figure 26:
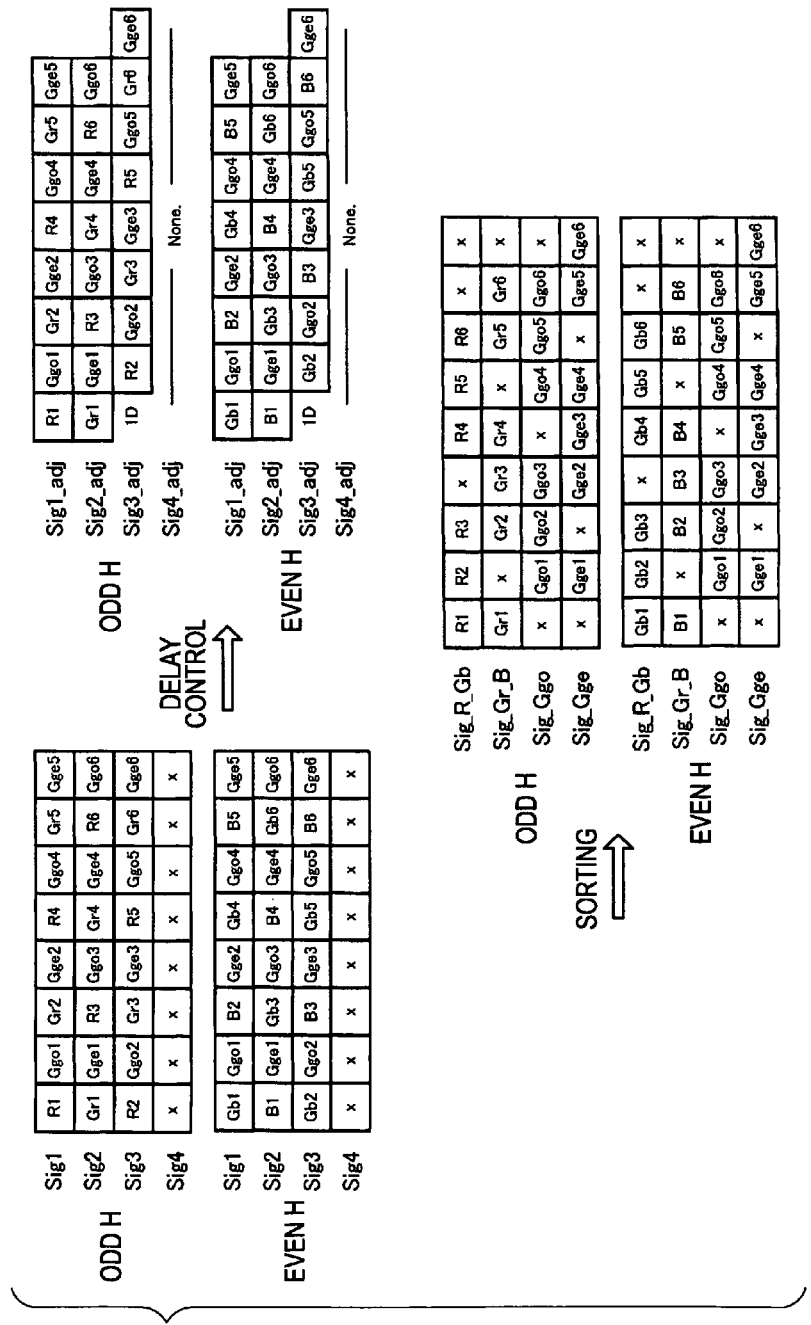
FIG. 26 illustrates the image signal arrangement when the number of readout channels of an image sensor is "6" in the MUX type B.
Figure 27:
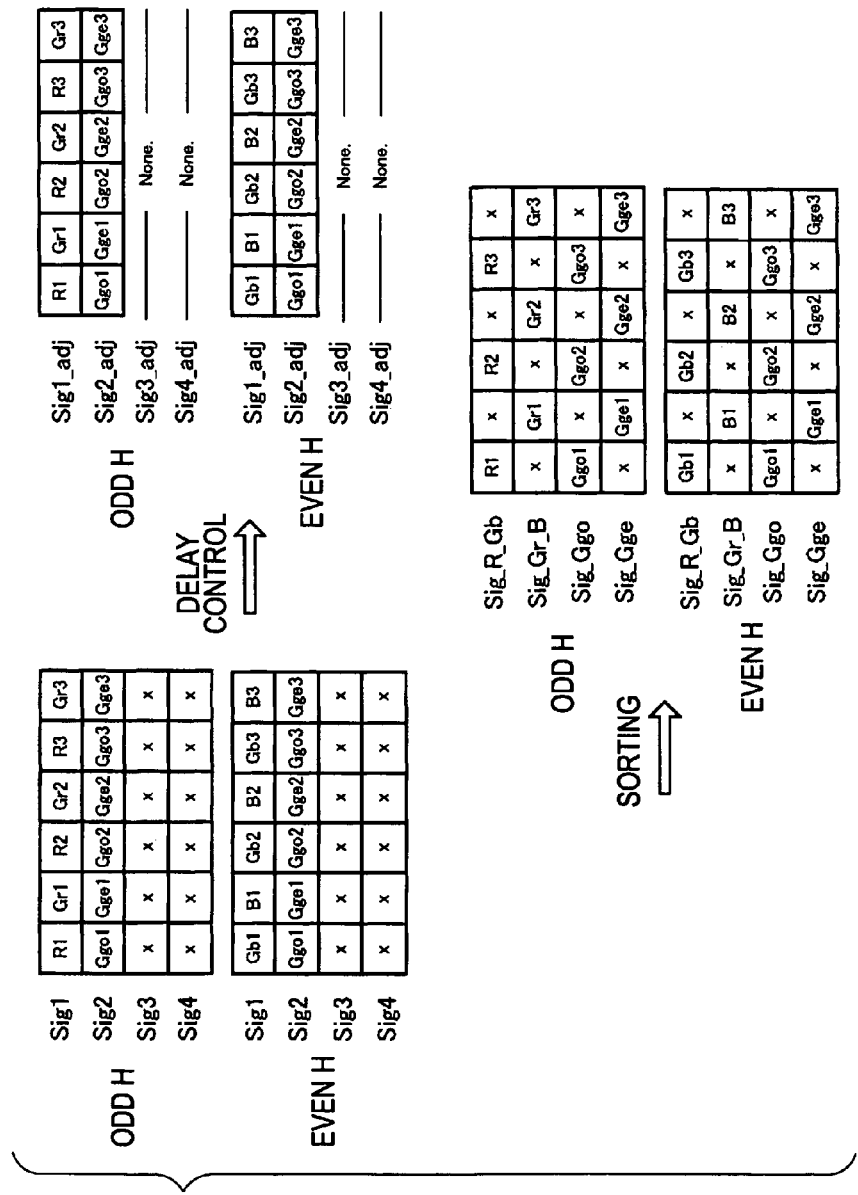
FIG. 27 illustrates the image signal arrangement when the number of readout channels of an image sensor is "4" in the MUX type A.
Figure 28:
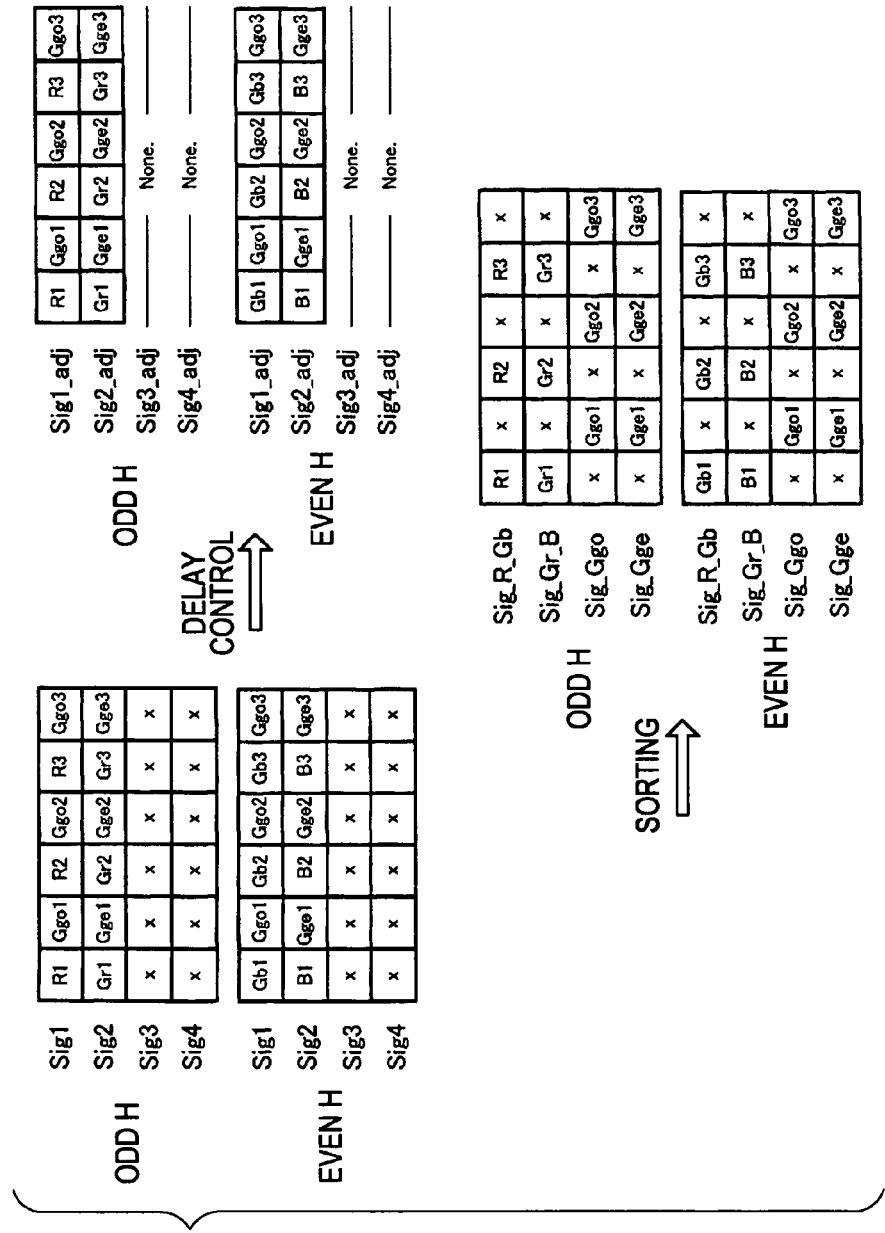
FIG. 28 illustrates the image signal arrangement when the number of readout channels of an image sensor is "4" in the MUX type B.
Figure 29:
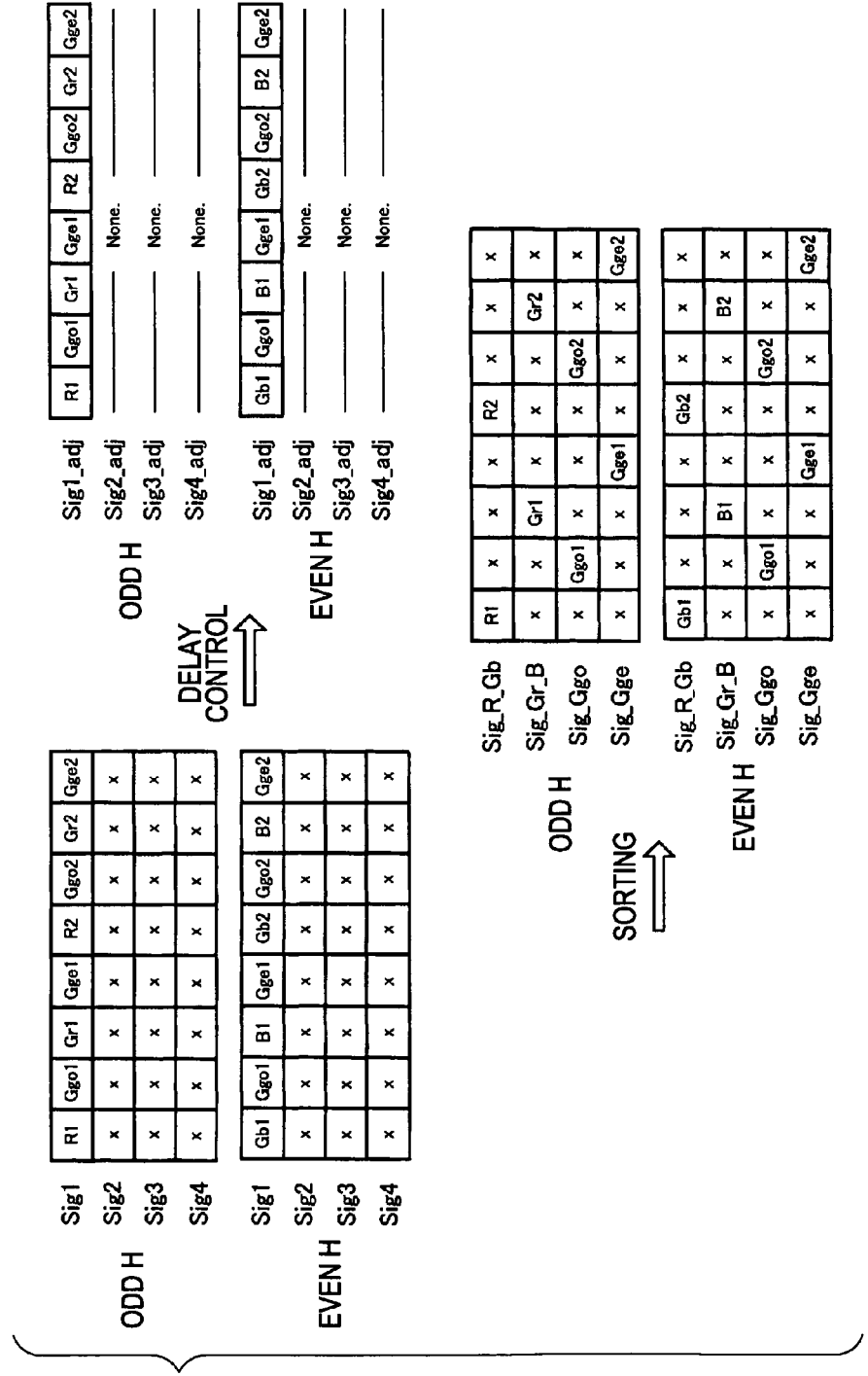
FIG. 29 illustrates the image signal arrangement when the number of readout channels of an image sensor is "2" in the MUX types A and B.

The specific examples of the arrangements of the image signal before and after the above-described sorting operation is performed are described for each of the color sequences with reference to FIGS. 23 to 29. FIGS. 23 and 24 illustrate the image signal arrangements when the number of the readout channels of the image sensor is "8" in the MUX type A and B, respectively. FIGS. 25 and 26 illustrate the image signal arrangements when the number of the readout channels of the image sensor is "6" in the MUX type A and B, respectively. FIGS. 27 and 28 illustrate the image signal arrangements when the number of the readout channels of the image sensor is "4" in the MUX type A and B, respectively. FIG. 29 illustrates the image signal arrangement when the number of the readout channels of the image sensor is "2" in the MUX type A and B.

As shown in FIGS. 23 to 29, the write control unit 50 having the above-described configuration can sort the input signals by filter component and write the sorted signals to the corresponding storage areas of the sort memory 40, regardless of the number of readout channels of the image sensor and the method of multiplexing. For example, if the number N of output channels of the image sensor is not equal to the number of filter components of the image signals processed by the digital signal processing circuit 14 in parallel (four components R, Gr, Ggo, and Gge or four components Gb, B, Ggo, and Gge in this embodiment), more specifically, if, for example, the signals are read out using six channels, as shown in FIGS. 25 and 26, three or more types of the filter component may be transmitted to one channel after multiplexing. Even in such a case, the input signals can be sorted by filter component.

Additionally, as described above, the signals are output from the write control unit 50 via the channels for individual filter components. However, the signals of the filter components are not always output at timings appropriate for the parallel processing in the digital signal processing circuit 14. For example, as shown in FIG. 24, in the signals in an odd H period after the sorting, R2, Gr2, Ggo1, and Gge1 are output at the same time. As can be seen from FIG. 4, these pixels include pixels that have different spatial phases on the image sensor. Therefore, these pixels should not be processed in the digital signal processing circuit 14 at the same time. In addition, if the number of channels of the multiplexed signal is less than the number of the types of filter component (in the cases shown in FIGS. 25 to 29), it follows that the signals of all the filter components required for the digital signal processing circuit 14 are not output at the same time.

In order to align such variations in the output timings, the sorted signals are output via the sort memory 40. The image signals for each filter component output from the write control unit 50 are sequentially stored in a contiguous area of the sort memory 40 regardless of the output timings. The write address in the sort memory 40 generated by the write control unit 50 matches the spatial phase. Therefore, after the signals have been stored in the sort memory 40, the output timings of all of the channels can be synchronized by reading out the signals in order of increasing address.

Figure 30:
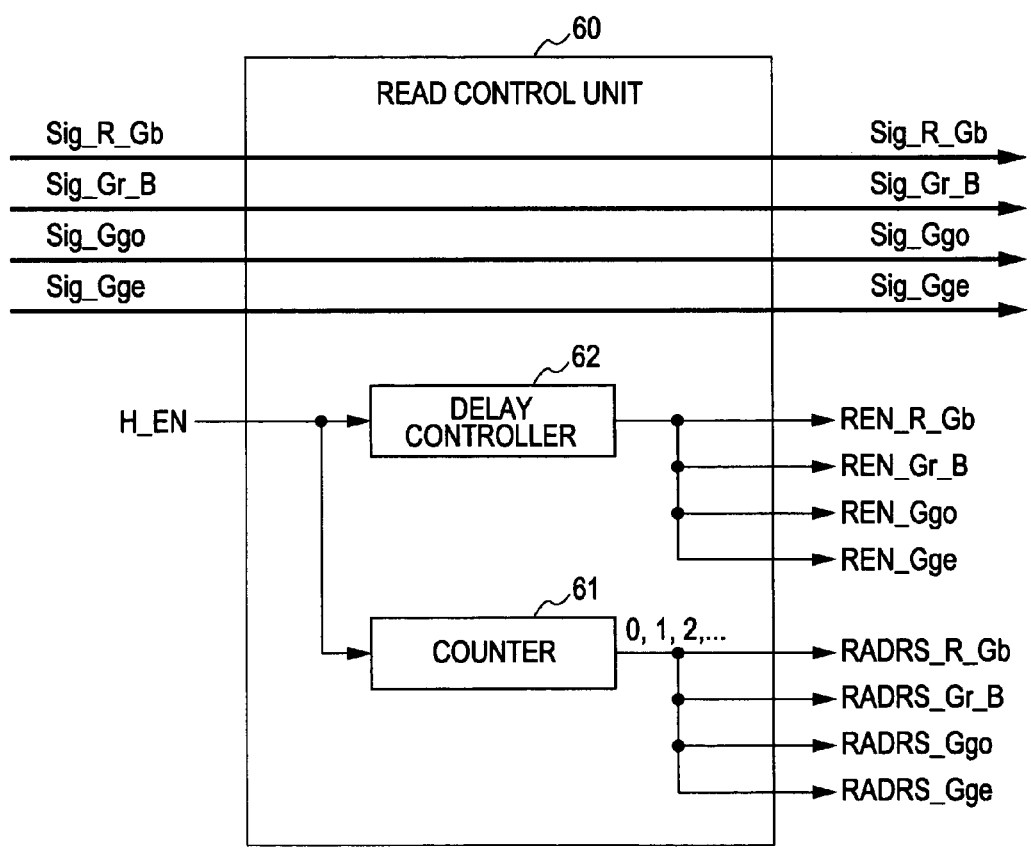
FIG. 30 is a block diagram of the internal configuration of a read control unit.

FIG. 30 is a block diagram of the internal configuration of the read control unit 60.

As shown in FIG. 30, the read control unit 60 includes a counter 61 for outputting a read address and a delay controller 62 for synchronizing the output timing of the enable signal with the address output. The counter 61 counts the pixel clock in ascending order during the horizontal effective period in which the enable signal H_EN is at the H level. The counter 61 resets the count value at the end of the horizontal effective period. The count value is output to the sort memory 40 as the read addresses of the storage areas for individual filter components (i.e., RADRS_R_Gb, RADRS_Gr_B, RADRS_Ggo, and RADRS_Gge). The delay of the delay controller 62 is set in accordance with the operational delay of the counter 61. The delay-adjusted enable signal H_EN is output to the sort memory 40 as enable signals REN_R_Gb, REN_Gr_B, REN_Ggo, and REN_Gge that indicate the permission of performance of a read operation from the storage areas.

By using the read control unit 60 having such a simplified structure, the image signals sorted by filter component can be output at proper timings. That is, the signals of the individual filter components can be output so that the spatial positions on the image sensor are properly combined. Accordingly, the digital signal processing circuit 14 that has received such image signals can process the input image signals in the same manner at all times, regardless of the color sequence of the image signal output from the AFE circuit 13.

Figure 31:
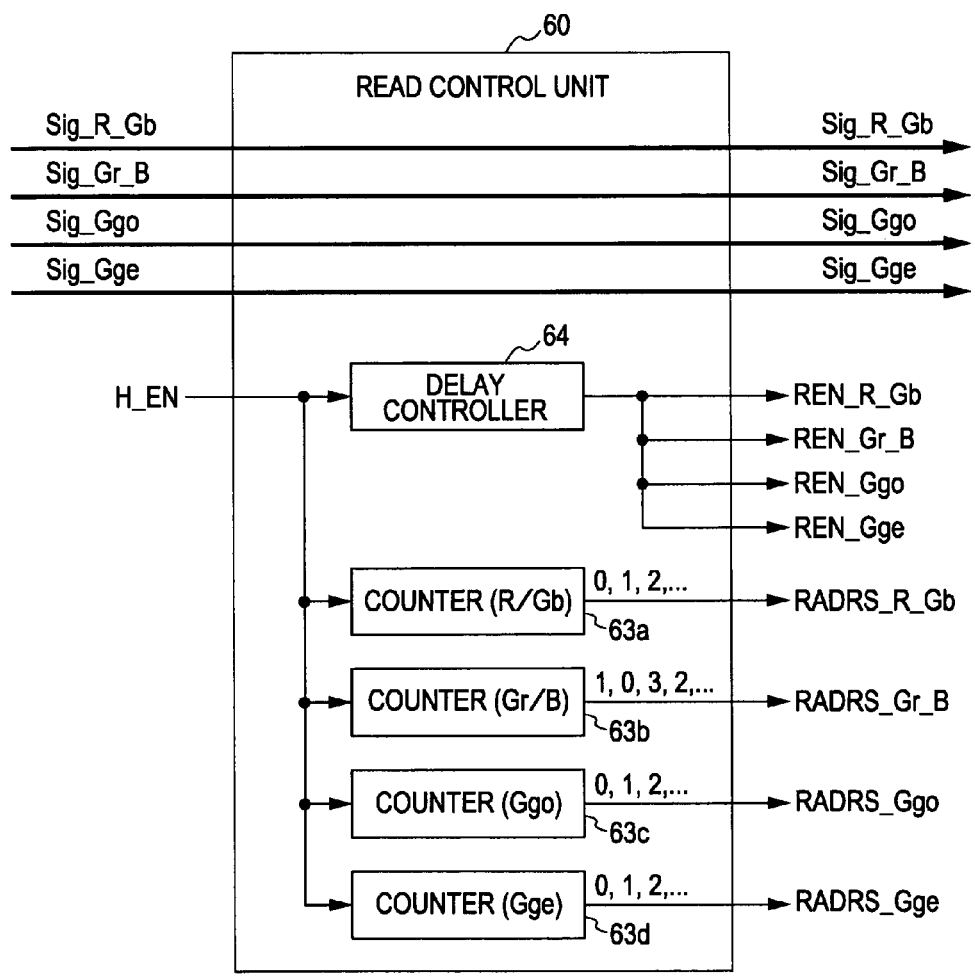
FIG. 31 is a block diagram of the internal configuration of a read control unit according to another embodiment of the present invention.

In the color sequence used in the above-described embodiment, the pixel signal of a pixel positioned on the image sensor spatially at the leftmost end is output first. However, in practice, such a condition is not always satisfied. For example, if the image sensor has a function of outputting image signals in a high screen rate by adding signals from adjacent pixels on the image sensor and having the same filter component and outputting the signals at the same time without thinning out the number of output signals and without increasing the readout frequency, the image signals are not always output to the sort memory 40 in the order of arrangement in the horizontal direction. For example, the image signals may be output in the order of R2, R1, R4, R3, . . . In this case, the signal from the spatially left pixel is not necessarily stored at a smaller address of the sort memory 40, and therefore the digital signal processing circuit 14 cannot properly process the signals if the digital signal processing circuit 14 reads the signals in order of increasing address. FIG. 31 illustrates the configuration of the read control unit 60 that can support even such a case.

FIG. 31 is a block diagram of the internal configuration of a read control unit 60 according to another embodiment of the present invention.

As shown in FIG. 31, the read control unit 60 includes counters 63a to 63d for individual filter components and a delay controller 64. The counters 63a to 63d generate the read addresses. The delay controller 64 synchronizes the output timing of the enable signal with the operational timing of the counters 63a to 63d.

Like the counter 61 shown in FIG. 30, the counters 63a to 63d count the pixel clock during the horizontal effective period. The count values serve as the read addresses of the storage areas for individual filter components (i.e., RADRS_R_Gb, RADRS_Gr_B, RADRS_Ggo, and RADRS_Gge). Under the control of the camera control circuit 15, the counters 63a to 63d can independently control their counting operations. As described above, even in the color sequence that is not output in the order in the horizontal direction, in general, the spatial positions of the output signals have some regularity. Therefore, the counters 63a to 63d carry out the count operations in accordance with the regularity.

For example, in terms of the B component, when B2, B1, B4, B3, . . . are written to the sort memory 40, the counter 63b corresponding to the B component carries out a count operation using the numbers of 1, 0, 3, 2 . . . A counter that carries out a count operation having regularity is easily implemented. If each of the counters 63a to 63d can selectively carry out a plurality of count operations, the number of types of color sequence supported can be increased.

As noted above, since the digital signal processing circuit 14 includes the sort processing unit 21 at the image-signal input stage to the camera signal processing unit 22, the image signals can be input to the camera signal processing unit 22 using the same processing rule at all times. Therefore, various types of color sequence can be supported without complicating the processing procedure and the circuit configuration of the camera signal processing unit 22 and without increasing the scale of the circuit configuration. In particular, by determining the number of output channels of the sort processing unit 21 to be the number of types of a filter component processed in parallel or an integral multiple of that number, the configuration of the camera signal processing unit 22 and, in particular, a processing block operating in consideration of the special position on the image sensor (e.g., noise reduction or defective pixel correction) can be simplified.

In addition, simply by setting a control parameter in accordance with the color sequence of the input signal, the sort processing unit 21 can support various types of a color sequence without changing the circuit configuration thereof. Thus, the scale of the circuit can be significantly reduced, compared with the digital signal processing circuit 14 including processing circuits each of which processes one of the color sequences.

Accordingly, the versatile digital signal processing circuit 14 can be achieved in which the number of readout channels of the image sensor, a method of multiplexing signals read out via multiple channels, a method of thinning out the pixels, the number of pixels, and filter coding are freely combined. Thus, the development and manufacturing cost can be reduced when the specification of the image sensor is changed or the series of the product is expanded in the future.

While the foregoing embodiments have been described with reference to the filter coding shown in FIG. 2, the present invention is applicable to an image capturing apparatus using a different filter coding.

Figure 32:
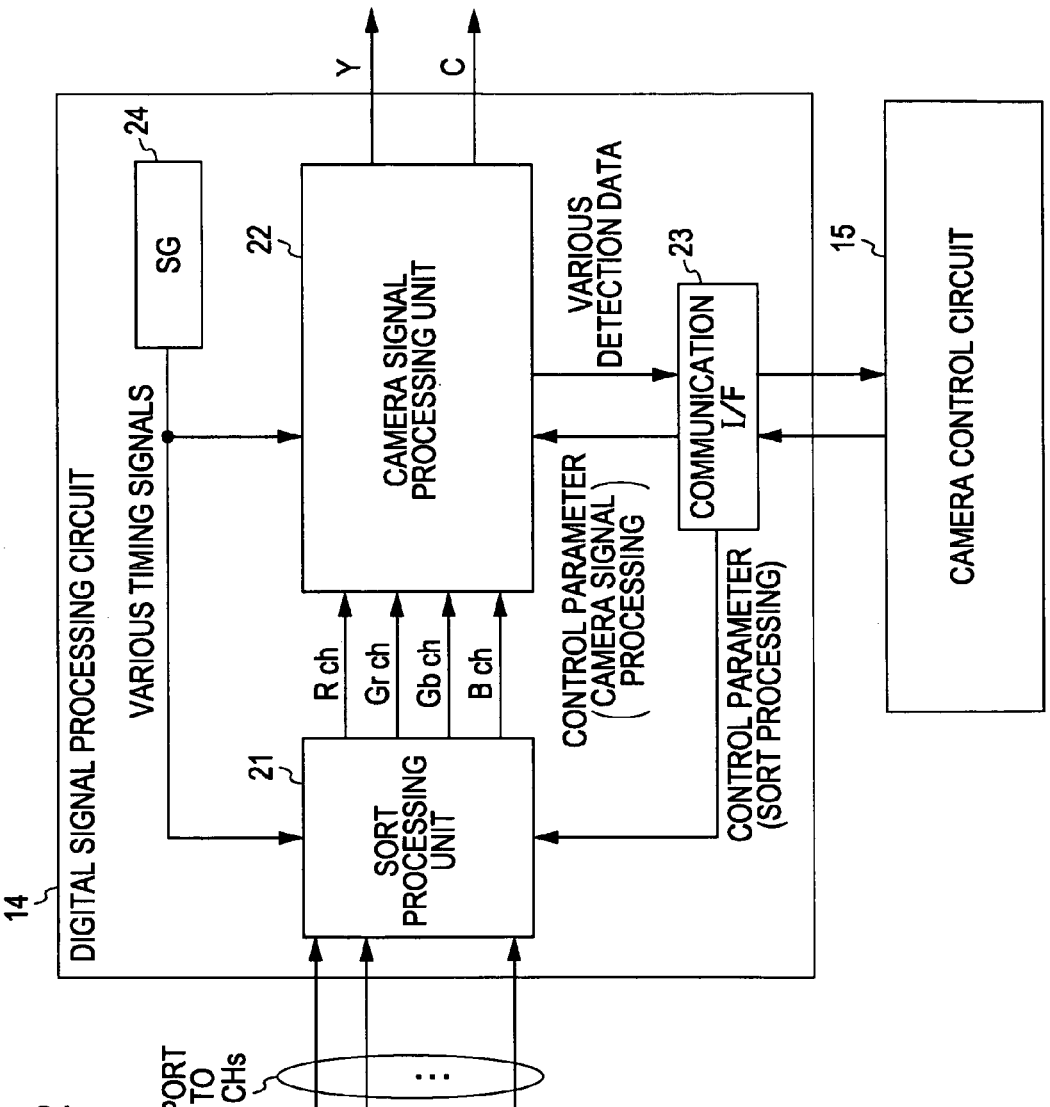
FIG. 32 is a block diagram of a digital signal processing circuit included in an image capturing apparatus using a Bayer array format.
Figure 33:
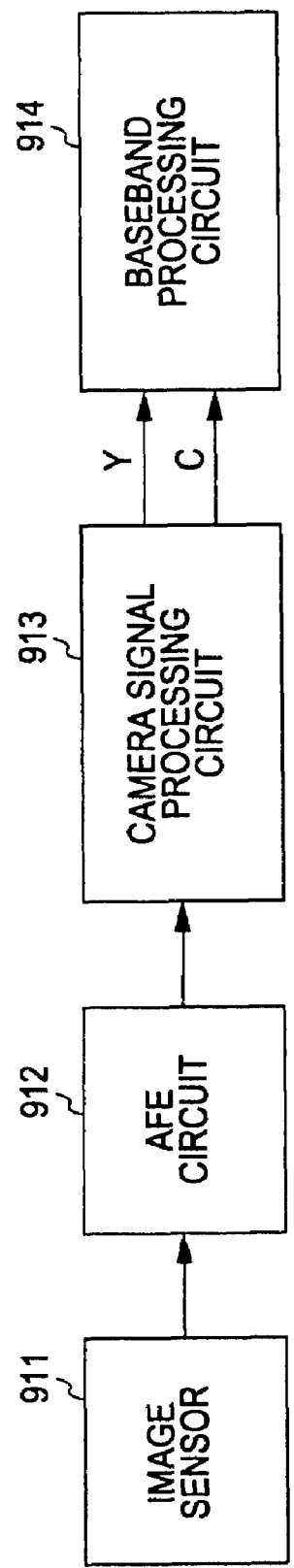
FIG. 33 is a block diagram of an exemplary structure of a main portion of a known image capturing apparatus including a one-channel-output type image sensor.
Figure 34A:
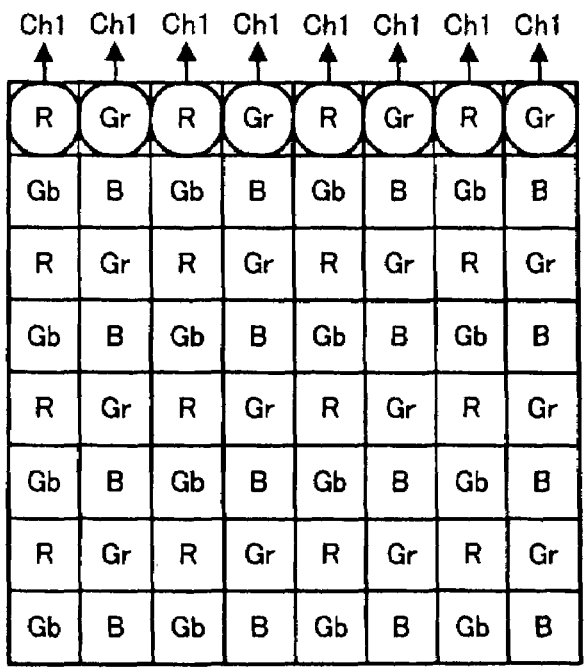
FIGS. 34A and 34B are diagrams illustrating a color sequence when pixel signals of an image sensor having the Bayer array format are output from one output channel.
Figure 34B:
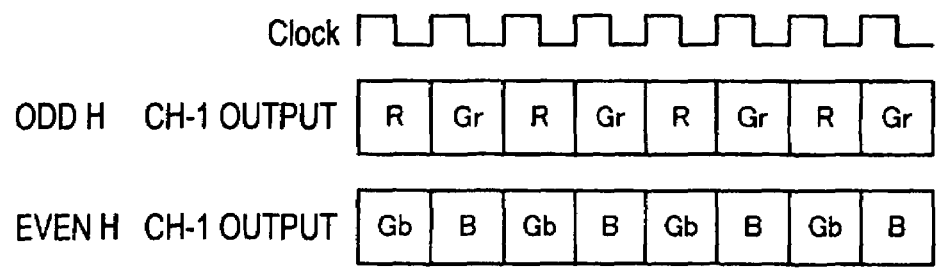
Figures 35A, 35B:
FIGS. 35A and 35B are diagrams illustrating a color sequence when pixel signals of an image sensor are read out using two channels.
Figure 36A:
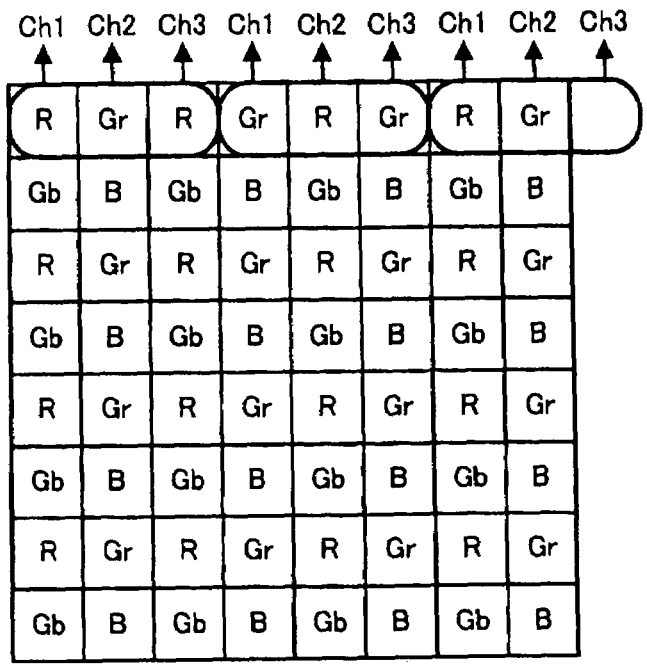
FIGS. 36A and 36B are diagrams illustrating a color sequence when pixel signals of an image sensor are read out using three channels.
Figure 36B:
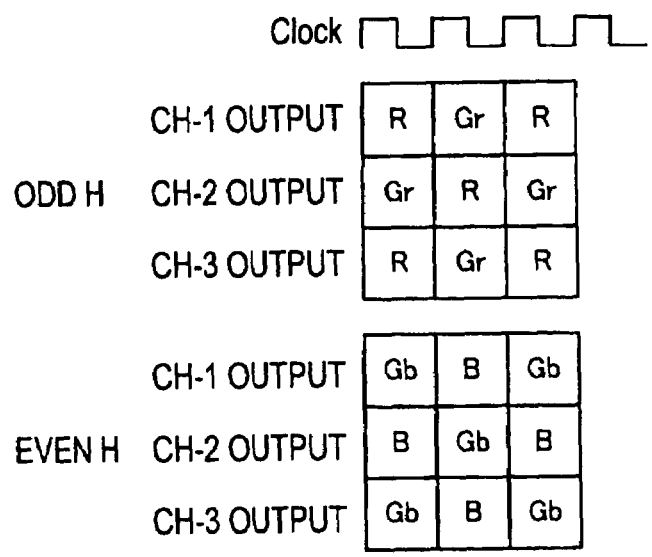
Figures 37A, 37B:
FIGS. 37A and 37B are diagrams illustrating a color sequence when pixel signals of an image sensor are read out using four channels.
Figure 38A:
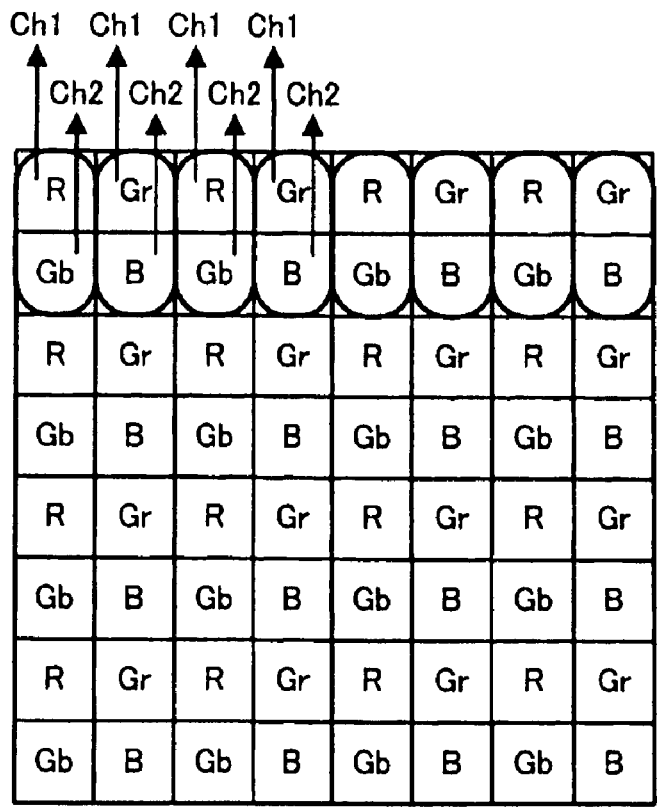
FIGS. 38A and 38B are diagrams illustrating a color sequence when pixel signals in two rows are read out using two channels.
Figure 38B:
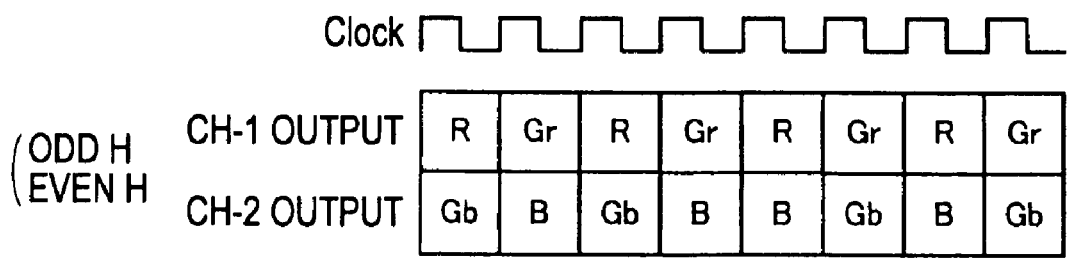
Figure 40A:
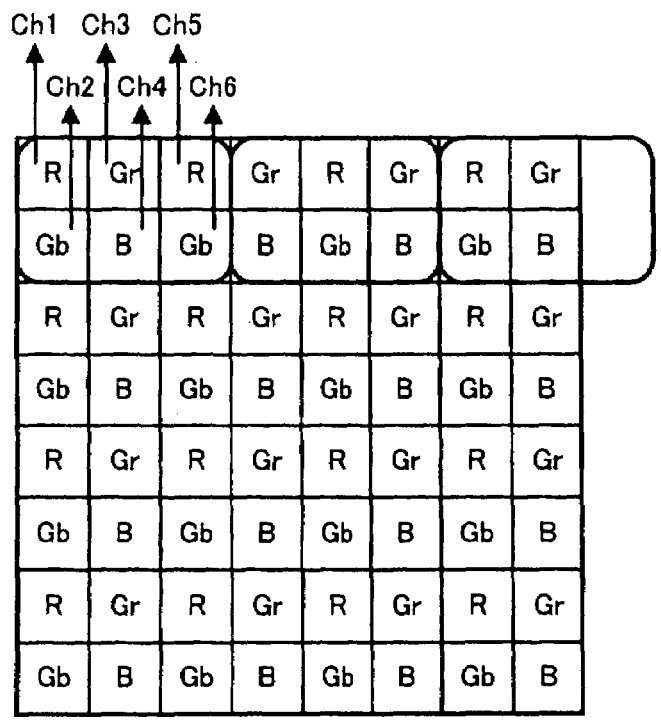
FIGS. 40A and 40B are diagrams illustrating a color sequence when pixel signals in two rows are read out using six channels.
Figure 40B:
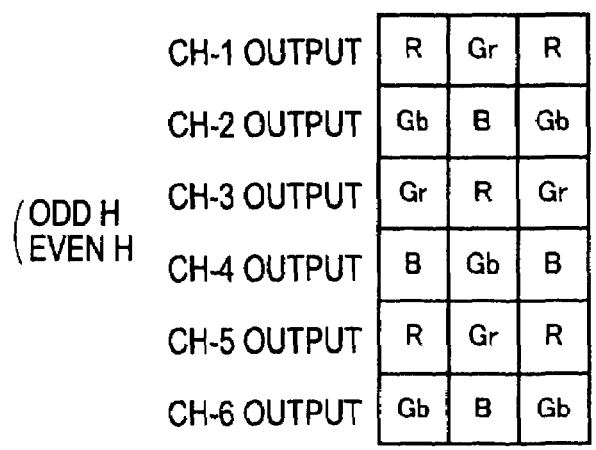
Figure 41:
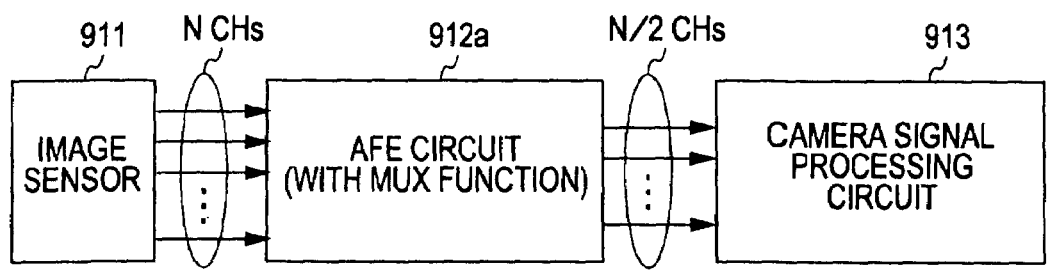
FIG. 41 is an exemplary block diagram of a signal processing system having the capability to multiplex pixel signals.

FIG. 32 is a block diagram of a digital signal processing circuit included in an image capturing apparatus using the Bayer array format as different filter coding.

In the Bayer array format, in general, as shown in FIG. 32, the camera signal processing unit 22 processes the R, Gr, Gb, and B filter components in parallel during both odd H period and even H period. Even in such a case, by using a sort processing unit 21 having the above-described configuration, image signals of the four types of filter format can be output from four output channels for the camera signal processing unit 22, regardless of the number of readout channels of the image sensor, the number of pixels, and a method of multiplexing signals. In addition, the camera signal processing unit 22 can process image signals captured by an image sensor using different filter coding (e.g., the Bayer array format or the filter coding shown in FIG. 2) by means of a general-purpose circuit whose setting is controlled by the camera control circuit 15. In such a case, a more versatile digital signal processing circuit 14 can be achieved.

Furthermore, the embodiments of the present invention are applicable to an image capturing apparatus using a solid-state image sensor (e.g., a digital video camera and a digital still camera) and an apparatus including such an image capturing function (e.g., a cell phone and a personal digital assistant). In addition, as well as the digital signal processing circuit of the image capturing apparatus, the embodiments of the present invention are applicable to a processing circuit that receives data in a specific data arrangement via multiple channels and processes that data when a plurality of data sequences of the input data are anticipated.

In addition, the above-described processing can be achieved by means of a computer. In such a case, a program describing the same function as that of the image processing apparatus (such as a function corresponding to that of the meta data extracting unit 21) is provided. By executing the program, the computer realizes the above-described function. The program describing the function can be stored in a computer-readable recording medium. Examples of the computer-readable recording medium include a magnetic recording unit, an optical disk, a magnetooptical disk, and a semiconductor memory.

In order to distribute the program, for example, a removable recording medium (such as an optical disk or a semiconductor memory) including the program is distributed. Alternatively, the program is stored in a storage unit of a server computer and the server computer can transfer the program to a different computer via a network.

The computer that executes the program stores the program stored in the removable recording medium or the program transferred from the server computer in a storage unit of the computer. Subsequently, the computer reads out the program stored in the storage unit of the computer and executes a process according to the program. Additionally, the computer can directly read the program from the removable recording medium and can execute a process according to the program. Furthermore, the computer can sequentially execute processes according to pieces of the program every time the computer receives a piece of the program from the server computer.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing apparatus for processing a color image signal, comprising:
    signal processing means for processing a plurality of image signals in parallel, the plurality of image signals being in one-to-one correspondence with predetermined filter components;
    storage means including storage areas in one-to-one correspondence with the filter components;
    parameter receiving means for receiving a control parameter indicative of a setting in accordance with an input sequence of the filter components in the image signal;
    writing means for sorting multichannel input image signals based on a signal output from a solid-state image sensor by the filter components thereof based on the setting indicated by the control parameter, the writing means writing the sorted image signals to the corresponding storage areas; and
    reading means for sequentially reading out the image signals from the storage areas via individual output channels, the reading means delivering the image signals to the signal processing means.

2. The image processing apparatus according to claim 1, wherein the writing means includes:
    enable-signal generating means for generating an enable signal indicative of the appearance of the filter component in the input image signal in each of the multiple channels based on the setting indicated by the control parameter;
    delay control means for controlling delays of the input image signal and the enable signal to be the same clock cycle for each channel so that the signals of the filter component do not appear at the same time; and
    writing control means for sorting the image signals from the delay control means by the filter components thereof on the basis of the enable signal from the delay control means and sequentially writing the image signals to the corresponding storage area contiguously from the beginning of the storage area.

3. The image processing apparatus according to claim 2, wherein the enable-signal generating means includes:
   counting means for repeatedly incrementing a count value up to a repeat count of the filter components appearing in the input image signal in each of the multiple channels in synchronization with the input of a pixel signal;
   flag outputting means for outputting a flag signal indicating whether each of the filter components appears in the input image signal for each channel of the input image signal each time the count value is input from the counting means based on the setting indicated by the control parameter; and
   a plurality of selecting means, each receiving the flag signal for the same filter component and the same channel and selectively outputting the flag signal corresponding to the count value of the counting means as the enable signal.

4. The image processing apparatus according to claim 3, wherein the repeat count is a variable that depends on the setting indicated by the control parameter.

5. The image processing apparatus according to claim 2, wherein the writing control means includes:
   a plurality of channel selecting means, each selecting one channel from the delay control means and outputting an image signal of the selected channel to the corresponding storage area; and
   selection control means for controlling a selecting operation of each channel selecting means in accordance with a combination of the filter components created from the enable signals received from the delay control means.

6. The image processing apparatus according to claim 1, wherein the reading means includes:
   a plurality of address counting means for carrying out counting operations in accordance with a rule selected from among a plurality of rules in response to the setting indicated by the control parameter and outputting the read addresses of the storage areas.

7. The image processing apparatus according to claim 1, wherein the number of the output channels from the reading means to the signal processing means is equal to the number of filter components or an integral multiple of the number of filter components.

8. An image capturing apparatus for capturing an image using a solid-state image sensor, comprising:
   signal processing means for processing a plurality of image signals in parallel, the plurality of image signals being in one-to-one correspondence with filter components;
   storage means including storage areas in one-to-one correspondence with the filter components;
   parameter receiving means for receiving a control parameter indicative of a setting in accordance with an input sequence of the filter components in the image signal;
   writing means for sorting multichannel input image signals based on a signal output from a solid-state image sensor by the filter components thereof based on the setting indicated by the control parameter, the writing means writing the sorted image signals to the corresponding storage areas; and
   reading means for sequentially reading out the image signals from the storage areas via individual output channels, the reading means delivering the image signals to the signal processing means.

9. The image capturing apparatus according to claim 8, wherein the solid-state image sensor is capable of reading signals from different pixels via a plurality of channels in parallel.

10. The image capturing apparatus according to claim 9, further comprising:
    multiplexing means for time multiplexing multichannel image signals read out of the solid-state image sensor into image signals of reduced multiple channels and outputting the image signals of reduced multiple channels.

11. A method of supplying a signal processing circuit with multichannel input image signals based on a signal output from a solid-state image sensor, the signal processing circuit being capable of processing a plurality of image signals in parallel, the plurality of image signals being in one-to-one correspondence with filter components, the method comprising:
    receiving a control parameter indicative of a setting in accordance with an input sequence of the filter components in the input image signals;
    sorting the input image signals by the filter components thereof based on the setting indicated by the control parameter and writing, in a one-to-one fashion, the sorted image signals to storage areas provided in one-to-one correspondence with the filter components; and
    sequentially reading out the image signals from the storage areas via individual output channels and delivering the image signals to the signal processing circuit.

12. A computer-readable medium having stored thereon an image processing program for causing a computer to supply a signal processing circuit with multichannel input image signals based on a signal output from a solid-state image sensor, the signal processing circuit being capable of processing a plurality of image signals in parallel, the plurality of image signals being in one-to-one correspondence with filter components, the program comprising:
    receiving a control parameter indicative of a setting in accordance with an input sequence of the filter components in the input image signals;
    sorting the input image signals by the filter components thereof based on the setting indicated by the control parameter and writing, in a one-to-one fashion, the sorted image signals to storage areas provided in one-to-one correspondence with the filter components; and
    sequentially reading out the image signals from the storage areas via individual output channels and delivering the image signals to the signal processing circuit.

13. An image processing apparatus for processing an image obtained by imaging means including a color filter for color coding, comprising:
    signal input means for inputting multichannel image signals;
    signal processing means for processing a plurality of image signals regarding specific filter components contained in the input image signals in parallel;
    pulse signal set generating means for generating a pulse signal set associated with the specific filter components based on a first control parameter set from outside the image processing apparatus;
    delay control means for delaying the input image signals and the pulse signals based on a second control parameter so that the image signals regarding the specific filter components contained in the input image signals and the pulse signals do not appear at the same time;
    sorting means for sorting the delay-controlled input image signals into the image signals regarding the specific filter components respectively based on the delay-controlled pulse signals from the delay control means;
    storage means for separately storing the image signals regarding the specific filter components;

writing control means for separately writing the sorted image signals regarding the specific filter components to the storage means; and reading control means for reading out the image signals regarding the specific filter components from the storage means via corresponding output channels and for transmitting the image signals regarding the specific filter components to the signal processing means.

14. The image processing apparatus according to claim 13, wherein the first control parameter includes an enable signal generation parameter and the second control parameter includes a sort parameter.

15. The image processing apparatus according to claim 13, wherein the first control parameter is a variable and an image signal regarding a desired filter component is extracted by changing the first control parameter.

16. The image processing apparatus according to claim 13, wherein the imaging means obtains the image using an X-Y addressing type solid-state image sensor.

17. An image processing apparatus for processing an image obtained by imaging means including a color filter for color coding, comprising:

signal input means for inputting multichannel image signals;

signal processing means for processing a plurality of image signals regarding specific filter components contained in the input image signals in parallel;

delay control means for delaying the input image signals for each channel so that the image signals regarding the specific filter components contained in the input image signals do not appear at the same time;

storage control means for sorting the delay-controlled input image signal into the image signals regarding the specific filter components respectively and for storing the image signals in corresponding storage means; and read control means for reading out the image signals regarding the specific filter components stored in the storage means and for transmitting the image signals regarding the specific filter components to the signal processing means.

18. An image processing apparatus for processing a color image signal, comprising:

a signal processing unit configured to process a plurality of image signals in parallel, the plurality of image signals being in one-to-one correspondence with predetermined filter components;

a storage unit including storage areas in one-to-one correspondence with the filter components;

a parameter receiving unit configured to receive a control parameter indicative of a setting in accordance with an input sequence of the filter components in the image signal;

a writing unit configured to sort multichannel input image signals based on a signal output from a solid-state image sensor by the filter components thereof based on the setting indicated by the control parameter, the writing unit writing the sorted image signals to the corresponding storage areas; and a reading unit configured to sequentially read out the image signals from the storage areas via individual output channels, the reading unit delivering the image signals to the signal processing unit.

19. An image capturing apparatus for capturing an image using a solid-state image sensor, comprising:

a signal processing unit configured to process a plurality of image signals in parallel, the plurality of image signals being in one-to-one correspondence with filter components;

a storage unit including storage areas in one-to-one correspondence with the filter components;

a parameter receiving unit configured to receive a control parameter indicative of a setting in accordance with an input sequence of the filter components in the image signal;

a writing unit configured to sort multichannel input image signals based on a signal output from a solid-state image sensor by the filter components thereof based on the setting indicated by the control parameter, the writing unit writing the sorted image signals to the corresponding storage areas; and a reading unit configured to sequentially read out the image signals from the storage areas via individual output channels, the reading unit delivering the image signals to the signal processing unit.

20. An image processing apparatus for processing an image obtained by an imaging unit including a color filter for color coding, comprising:

a signal input unit configured to input multichannel image signals;

a signal processing unit configured to process a plurality of image signals regarding specific filter components contained in the input image signals in parallel;

a pulse signal set generating unit configured to generate a pulse signal set associated with the specific filter components based on a first control parameter set from outside the image processing apparatus;

a delay control unit configured to delay the input image signals and the pulse signals based on a second control parameter so that the image signals regarding the specific filter components contained in the input image signals and the pulse signals do not appear at the same time;

a sorting unit configured to sort the delay-controlled input image signals into the image signals regarding the specific filter components respectively based on the delay-controlled pulse signals from the delay control unit;

a storage unit configured to separately store the image signals regarding the specific filter components;

a writing control unit configured to separately write the sorted image signals regarding the specific filter components to the storage unit; and a reading control unit configured to read out the image signals regarding the specific filter components from the storage unit via corresponding output channels and to transmit the image signals regarding the specific filter components to the signal processing unit.

21. An image processing apparatus for processing an image obtained by an imaging unit including a color filter for color coding, comprising:

a signal input unit configured to input multichannel image signals;

a signal processing unit configured to process a plurality of image signals regarding specific filter components contained in the input image signals in parallel;

a delay control unit configured to delay the input image signals for each channel so that the image signals regarding the specific filter components contained in the input image signals do not appear at the same time;

a storage control unit configured to sort the delay-controlled input image signal into the image signals regarding the specific filter components respectively and to store the image signals in corresponding storage units; and a read control unit configured to read out the image signals regarding the specific filter components stored in the storage units and to transmit the image signals regarding the specific filter components to the signal processing unit.

* * * * *